United States Patent
Akutsu

(10) Patent No.: US 12,263,810 B2
(45) Date of Patent: Apr. 1, 2025

(54) TRAVEL CONTROL APPARATUS, TRAVEL CONTROL METHOD, AND NON-TRANSITORY STORAGE MEDIUM

(71) Applicant: NEC Corporation, Tokyo (JP)

(72) Inventor: Tatsuki Akutsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 348 days.

(21) Appl. No.: 17/760,839

(22) PCT Filed: Jul. 6, 2020

(86) PCT No.: PCT/JP2020/026356
§ 371 (c)(1),
(2) Date: Mar. 16, 2022

(87) PCT Pub. No.: WO2021/059657
PCT Pub. Date: Apr. 1, 2021

(65) Prior Publication Data
US 2022/0332286 A1     Oct. 20, 2022

(30) Foreign Application Priority Data
Sep. 26, 2019   (JP) ................. 2019-175074

(51) Int. Cl.
*G06K 9/00* (2022.01)
*B60R 25/25* (2013.01)
(Continued)

(52) U.S. Cl.
CPC .......... *B60R 25/25* (2013.01); *B60R 25/305* (2013.01); *B60R 25/31* (2013.01); *B60R 25/34* (2013.01);
(Continued)

(58) Field of Classification Search
CPC ....... B60R 25/25; B60R 25/305; B60R 25/31; B60R 25/34; G06V 40/172; G06V 40/166; G06V 20/593; G06Q 10/02
(Continued)

(56) References Cited

U.S. PATENT DOCUMENTS

| 10,214,221 B2* | 2/2019 | Chen ................. G06F 1/163 |
| 2006/0215884 A1* | 9/2006 | Ota ................. B60R 25/255 |
| | | 382/118 |
| 2013/0311001 A1 | 11/2013 | Hampiholi | |

FOREIGN PATENT DOCUMENTS

| JP | 2004-330979 A | 11/2004 |
| JP | 2005-067353 A | 3/2005 |

(Continued)

OTHER PUBLICATIONS

International Search Report for PCT Application No. PCT/JP2020/026356, mailed on Sep. 26, 2020.
(Continued)

*Primary Examiner* — Jonathan S Lee
(74) *Attorney, Agent, or Firm* — Sughrue Mion, PLLC

(57) ABSTRACT

The present invention provides a travel control apparatus (20) including an in-vehicle image acquisition unit (21) that acquires an in-vehicle image generated by a camera for capturing an inside of a vehicle compartment of a reserved vehicle, an in-vehicle sensing unit (22) that senses that a reserving person is present within a vehicle compartment of the reserved vehicle, based on the in-vehicle image, and a permission output unit (23) that outputs, when it is sensed that the reserving person is present within a vehicle compartment of the reserved vehicle, travel permission of the reserved vehicle.

20 Claims, 24 Drawing Sheets

(51) Int. Cl.
    *B60R 25/30*      (2013.01)
    *B60R 25/31*      (2013.01)
    *B60R 25/34*      (2013.01)
    *G06Q 10/02*      (2012.01)
    *G06V 20/59*      (2022.01)
    *G06V 40/16*      (2022.01)

(52) U.S. Cl.
    CPC ........... *G06Q 10/02* (2013.01); *G06V 20/593* (2022.01); *G06V 40/166* (2022.01); *G06V 40/172* (2022.01)

(58) Field of Classification Search
    USPC ........................................................ 382/104
    See application file for complete search history.

(56) References Cited

FOREIGN PATENT DOCUMENTS

| | | |
|---|---|---|
| JP | 2005-207110 A | 8/2005 |
| JP | 2009-255766 A | 11/2009 |
| JP | 2011-225066 A | 11/2011 |
| JP | 2012-043042 A | 3/2012 |
| JP | 2019-159768 A | 9/2019 |

OTHER PUBLICATIONS

JP Office Action for JP Application No. 2021-548358, mailed on Aug. 15, 2023 with English Translation.

\* cited by examiner

FIG. 4

| USER IDENTIFICATION INFORMATION | NAME | AGE | ADDRESS | TELEPHONE NUMBER | FACE IMAGE | FEATURE VALUE | ... |
|---|---|---|---|---|---|---|---|
| 31897 | ICHIRO KAGAWA | 28 | TOKYO... | 090-... | 131819.jpg | *** | ... |
| .... | .... | .... | .... | .... | .... | .... | .... |

FIG. 5

| PARKING LOT IDENTIFICATION INFORMATION | VEHICLE IDENTIFICATION INFORMATION | RESERVATION DETAIL INFORMATION | ... |
|---|---|---|---|
| A013 | SHINAGAWA 300 WA × × - × × | AUGUST 28, 2019 9:00~17:00<br>USER IDENTIFICATION INFORMATION : 31B97<br>OTHER DRIVERS<br>(1) HANAKO TAKAMATSU, 121133.jpg, ***<br>(2) KOJI YAMAGUCHI, 121134.jpg, *** | .... |
| .... | .... | .... | .... |

FIG. 12

| RESERVATION DATE AND TIME | RESERVING PERSON INFORMATION | DRIVER INFORMATION | ... |
|---|---|---|---|
| AUGUST 28, 2019 9:00~17:00 | ICHIRO KAGAWA, 131819.jpg, *** ···· | (1) HANAKO TAKAMATSU, 121133.jpg, *** ············ (2) KOJI YAMAGUCHI, 121134.jpg, *** ············ ···· | ···· |
| ···· | ···· | ···· | ···· |

# TRAVEL CONTROL APPARATUS, TRAVEL CONTROL METHOD, AND NON-TRANSITORY STORAGE MEDIUM

This application is a National Stage Entry of PCT/JP2020/026356 filed on Jul. 6, 2020, which claims priority from Japanese Patent Application 2019-175074 filed on Sep. 26, 2019, the contents of all of which are incorporated herein by reference, in their entirety.

TECHNICAL FIELD

The present invention relates to a travel control apparatus, a travel control method, and a program.

BACKGROUND ART

A technique associated with the present invention is disclosed in Patent Documents 1 and 2. Patent Document 1 discloses a technique for monitoring an inside of a vehicle compartment of a vehicle for use in car sharing. Patent Document 2 discloses a technique for outputting a startup permission signal, when a comparison result between a face image of a driver generated by an in-vehicle camera and a face image of a driver registered in advance matches.

Related Document

Patent Document

[Patent Document 1] Japanese Patent Application Publication No. 2012-43042
[Patent Document 2] Japanese Patent Application Publication No. 2004-330979

DISCLOSURE OF THE INVENTION

Technical Problem

In a car sharing service, there is a case that use of a vehicle in a state that a reserving member has not got on the vehicle is inhibited. However, it is not easy to watch a behavior of violating such case. An exemplary object of the present invention is to provide a technique for restricting use of a vehicle in a state that a reserving member has not got on a vehicle.

Solution to Problem

An exemplary aspect of the invention is a travel control apparatus including:
an in-vehicle image acquisition means for acquiring an in-vehicle image generated by a camera for capturing an inside of a vehicle compartment of a reserved vehicle;
an in-vehicle sensing means for sensing that a reserving person is present within a vehicle compartment of the reserved vehicle, based on the in-vehicle image; and
a permission output means for outputting, when it is sensed that the reserving person is present within a vehicle compartment of the reserved vehicle, travel permission of the reserved vehicle.

Further, an exemplary aspect of the invention is a travel control method including:
by a computer,
acquiring an in-vehicle image generated by a camera for capturing an inside of a vehicle compartment of a reserved vehicle;
sensing that a reserving person is present within a vehicle compartment of the reserved vehicle, based on the in-vehicle image; and
outputting, when it is sensed that the reserving person is present within a vehicle compartment of the reserved vehicle, travel permission of the reserved vehicle.

Further, an exemplary aspect of the invention is a program causing a computer to function as:
an in-vehicle image acquisition means for acquiring an in-vehicle image generated by a camera for capturing an inside of a vehicle compartment of a reserved vehicle;
an in-vehicle sensing means for sensing that a reserving person is present within a vehicle compartment of the reserved vehicle, based on the in-vehicle image; and
a permission output means for outputting, when it is sensed that the reserving person is present within a vehicle compartment of the reserved vehicle, travel permission of the reserved vehicle.

Advantageous Effects of Invention

According to exemplary aspects of the present invention, it is possible to restrict use of a vehicle in a state that a reserving member has not got on the vehicle.

BRIEF DESCRIPTION OF THE DRAWINGS

FIG. 4 is a diagram schematically illustrating one example of information to be processed by the car sharing system according to the present example embodiment.
FIG. 5 is a diagram schematically illustrating one example of information to be processed by the car sharing system according to the present example embodiment.

FIG. 12 is a diagram schematically illustrating one example of information to be processed by the car sharing system according to the present example embodiment.

DESCRIPTION OF EMBODIMENTS

First Example Embodiment

"Overall Image and Overview of Car Sharing System"

Figure 1:
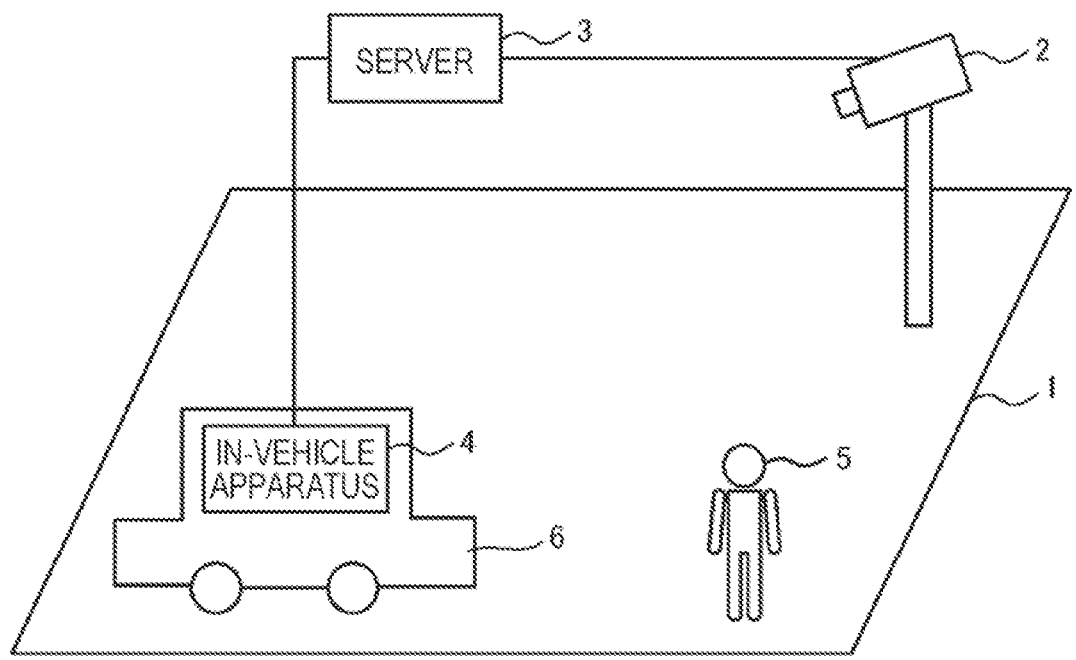
FIG. 1 is one example of a functional block diagram of a car sharing system according to a present example embodiment.

First, an overall image and an overview of a car sharing system according to a present example embodiment are described with reference to a functional block diagram in FIG. 1.

The car sharing system includes a camera 2, a server 3, and an in-vehicle apparatus 4. The camera 2 and the server 3 are configured to be communicable with each other. Further, the server 3 and the in-vehicle apparatus 4 are configured to be communicable with each other.

The camera 2 captures a site 1 where a vehicle 6 for use in a car sharing service is present.

The server 3 acquires an on-site image generated by the camera 2. Then, the server 3 senses, based on the on-site image, and an image of a reserving person 5 (user of the vehicle 6) registered in advance, that the reserving person 5 is present on the site 1. When sensing that the reserving person 5 is present on the site 1, the server 3 outputs a command of releasing a door lock of the vehicle 6.

The in-vehicle apparatus 4 is mounted in the vehicle 6. When acquiring a command of releasing a door lock output from the server 3, the in-vehicle apparatus 4 releases the door lock of the vehicle 6.

In the car sharing system as described above, it is possible to reduce a burden of a user for door lock release. Consequently, a car sharing service having high convenience is achieved.

"Configuration of Server 3"

Figure 2:
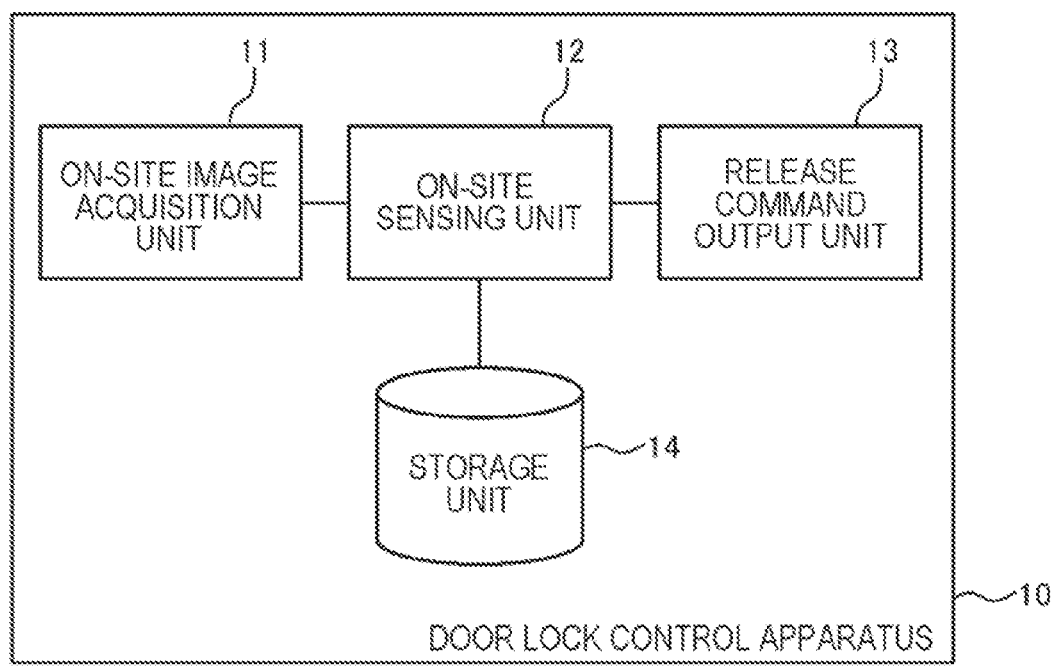
FIG. 2 is one example of a functional block diagram of a door lock control apparatus according to the present example embodiment.

Next, a configuration of the server 3 is described in detail. The server 3 includes a door lock control apparatus 10. FIG. 2 illustrates one example of a functional block diagram of the door lock control apparatus 10. As illustrated in FIG. 2, the door lock control apparatus 10 includes an on-site image acquisition unit 11, an on-site sensing unit 12, a release command output unit 13, and a storage unit 14. Note that, the door lock control apparatus 10 may not include the storage unit 14. In this case, an external apparatus configured to be communicable with the door lock control apparatus 10 includes the storage unit 14.

Each functional unit included in the door lock control apparatus 10 is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. It is understood by a person skilled in the art that there are various modification examples as a method and an apparatus of achieving the configuration.

Figure 3:
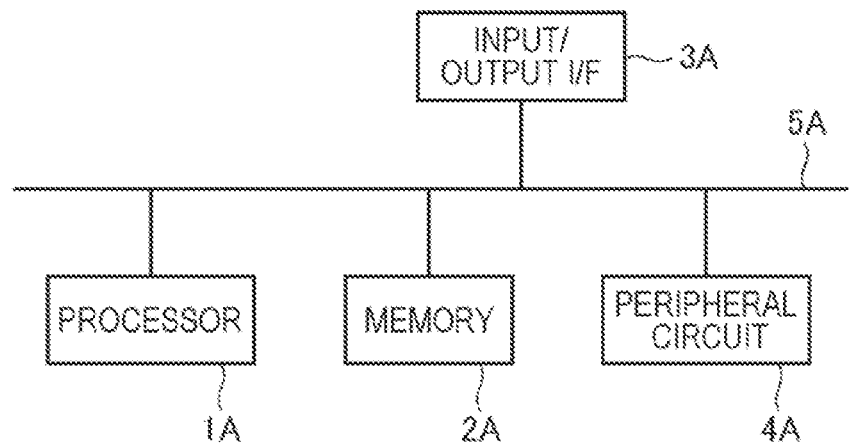
FIG. 3 is a diagram illustrating one example of a hardware configuration of an apparatus according to the present example embodiment.

FIG. 3 is a block diagram illustrating a hardware configuration of the door lock control apparatus 10. As illustrated in FIG. 3, the door lock control apparatus 10 includes a processor 1A, a memory 2A, an input/output interface 3A, a peripheral circuit 4A, and a bus 5A. The peripheral circuit 4A includes various modules. Note that, the peripheral circuit 4A may be omitted. Note that, the door lock control apparatus 10 may be configured by one apparatus that is physically and/or logically integrated, or may be configured by a plurality of apparatuses that are physically and/or logically separated. In a case where the door lock control apparatus 10 is configured by a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a touch panel, a physical button, a camera, and the like. The output apparatus is, for example, a display, a speaker, a printer, a mailer, and the like. The processor 1A can issue a command to each module, and perform an arithmetic operation, based on arithmetic operation results of these modules.

Next, referring back to FIG. 2, a configuration of each functional unit is described in detail.

The storage unit 14 stores various types of information relating to the car sharing service.

For example, the storage unit 14 stores user registration information as illustrated in FIG. 4. A user using the vehicle 6 in the car sharing service registers in advance information of himself/herself. The storage unit 14 stores the registered information, as the user registration information. In a case of an example illustrated in FIG. 4, the user registration information includes user identification information for identifying a plurality of users from one another, a name, age, an address, a telephone number, a face image, and a feature value extracted from the face image. Note that, the user registration information may include other information, or may not include a part of pieces of the exemplified information. As an example of other information, information relating to a driver's license of a vehicle, information relating to a tool for use in payment of a usage fee such as a credit card, and the like are exemplified, but other information is not limited thereto.

As a means for achieving advance registration, using a homepage, using an application, and the like are exemplified, but the means is not limited thereto.

Further, the storage unit 14 stores reservation information as illustrated in FIG. 5. After performing the above-described advance registration, a user using the vehicle 6 in the car sharing service makes a use reservation of the vehicle 6. The storage unit 14 stores a content designated by the use reservation, as the reservation information. In a case of an example illustrated in FIG. 5, the reservation information includes vehicle identification information of the reserved vehicle 6, parking lot identification information for identifying a place (such as a parking lot) where use of the reserved vehicle 6 is started, and reservation detail information. The reservation detail information includes a use start date and time, a use end date and time, user identification information (information for identifying a reserving person), and the like. Further, the reserving person information may include information (such as a name, age, a face image, and a feature value extracted from the face image) relating to a driver other than the reserving person. In a case where there is a possibility that a person other than the reserving person drives the vehicle, the reserving person registers in advance information relating to the driver other than the reserving person. Note that, the reservation information may include other information, or may not include a part of pieces of the exemplified information.

As a means for achieving use reservation of the vehicle 6, using a homepage, using an application, and the like are exemplified, but the means is not limited thereto.

The on-site image acquisition unit 11 acquires, from the camera 2, an on-site image generated by the camera 2 for capturing the site 1 where the reserved vehicle 6 is present.

The site 1 is a place where use of the vehicle 6 is started, and a place where the vehicle 6 is present. The site 1 may be a parking lot, may be an area (an owned land, a leased land) managed by a business entity providing the car sharing service, or may be other than the above.

The camera 2 is set at a position, an orientation, and setting capable of generating an image that enables to accurately recognize a person present on the site 1 by face recognition processing. One camera 2 may be installed or a plurality of cameras 2 may be installed on the site 1. The camera 2 may successively capture a moving image, or may capture a still image every predetermined time interval that is relatively short. The on-site image acquisition unit 11 acquires, from the camera 2, an on-site image generated by the camera 2 by real-time processing.

The on-site sensing unit 12 senses that the reserving person 5 is present on the site 1 by face recognition processing based on an on-site image acquired by the on-site image acquisition unit 11 and a face image of the reserving person 5 registered in advance and stored in the storage unit 14.

For example, the on-site sensing unit 12 determines a user (reserving person 5) who made a use reservation of the vehicle 6 being present on the site 1, based on the reservation information stored in the storage unit 14. Then, the on-site sensing unit 12 refers to the user registration information stored in the storage unit 14, and acquires a face image of the determined reserving person 5 or a feature value thereof. Then, the on-site sensing unit 12 senses that the reserving person 5 is present on the site 1 by face recognition processing based on the acquired face image or the feature value thereof, and the on-site image.

Note that, the on-site sensing unit 12 may determine a user (reserving person 5) who made a use reservation of the vehicle 6 being present on the site 1, in which a use start date and time registered in advance (or a time earlier than the use start date and time by a predetermined time) has come, based on the reservation information stored in the storage unit 14 and a current date and time. Then, the on-site sensing unit 12 may refer to the user registration information stored in the storage unit 14, and acquire a face image of the determined reserving person 5 or a feature value thereof. Then, the on-site sensing unit 12 may sense that the reserving person 5 in which the use start date and time has come is present on the site 1 by face recognition processing based on the acquired face image or the feature value thereof, and the on-site image.

When sensing that the reserving person 5 is present on the site 1, the release command output unit 13 outputs a command of releasing a door lock of the reserved vehicle 6. The output command is input to the in-vehicle apparatus 4.

Note that, when sensing that the reserving person 5 is present on the site 1, and a use start date and time registered in advance has come, the release command output unit 13 may output a command of releasing a door lock of the reserved vehicle 6.

Figure 6:
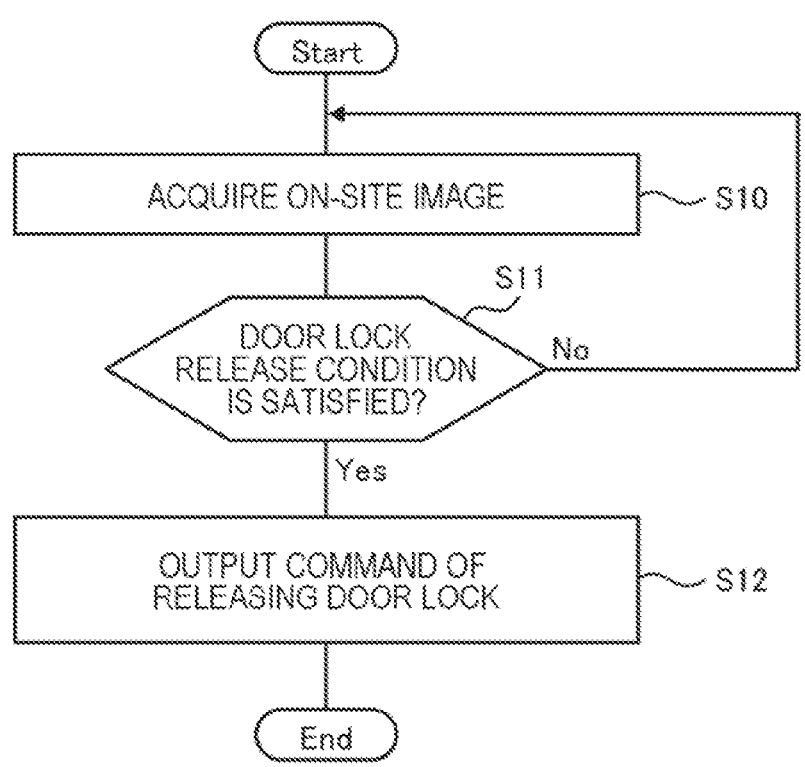
FIG. 6 is a flowchart illustrating one example of a flow of processing of the door lock control apparatus according to the present example embodiment.

Next, one example of a flow of processing of the door lock control apparatus 10 is described with reference to a flowchart in FIG. 6.

First, when the on-site image acquisition unit 11 acquires an on-site image (S10), the on-site sensing unit 12 determines whether a door lock release condition of releasing a door lock of the reserved vehicle 6 is satisfied, based on the on-site image (S11).

When the door lock release condition is satisfied (Yes in S11), the release command output unit 13 outputs a command of releasing a door lock of the reserved vehicle 6 (S12). On the other hand, when the door lock release condition is not satisfied (No in S11), the release command output unit 13 does not output the command.

Figure 7:
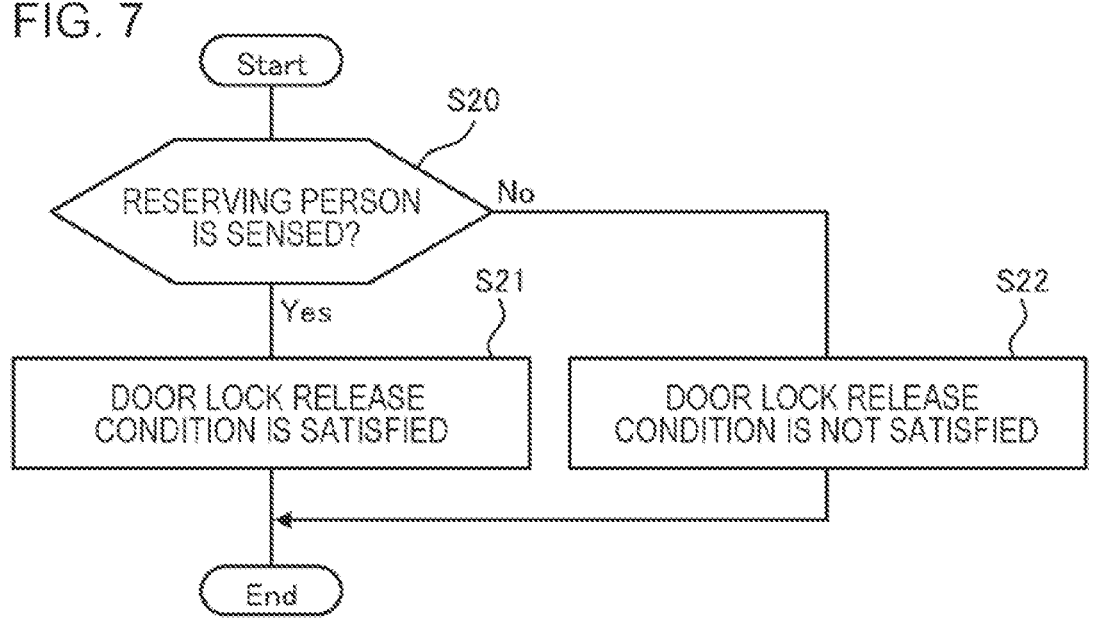
FIG. 7 is a flowchart illustrating one example of a flow of processing of the door lock control apparatus according to the present example embodiment.

Herein, one example of determination in S11 is described with reference to a flowchart in FIG. 7.

The on-site sensing unit 12 determines whether the reserving person 5 is present on the site 1, based on a face image of the reserving person 5 registered in advance or a feature value thereof, and an on-site image. When it is sensed that the reserving person 5 is present on the site 1 (Yes in S20), the door lock release condition is satisfied (S21). On the other hand, when it is not sensed that the reserving person 5 is present on the site 1 (No in S20), the door lock release condition is not satisfied (S22).

Figure 8:
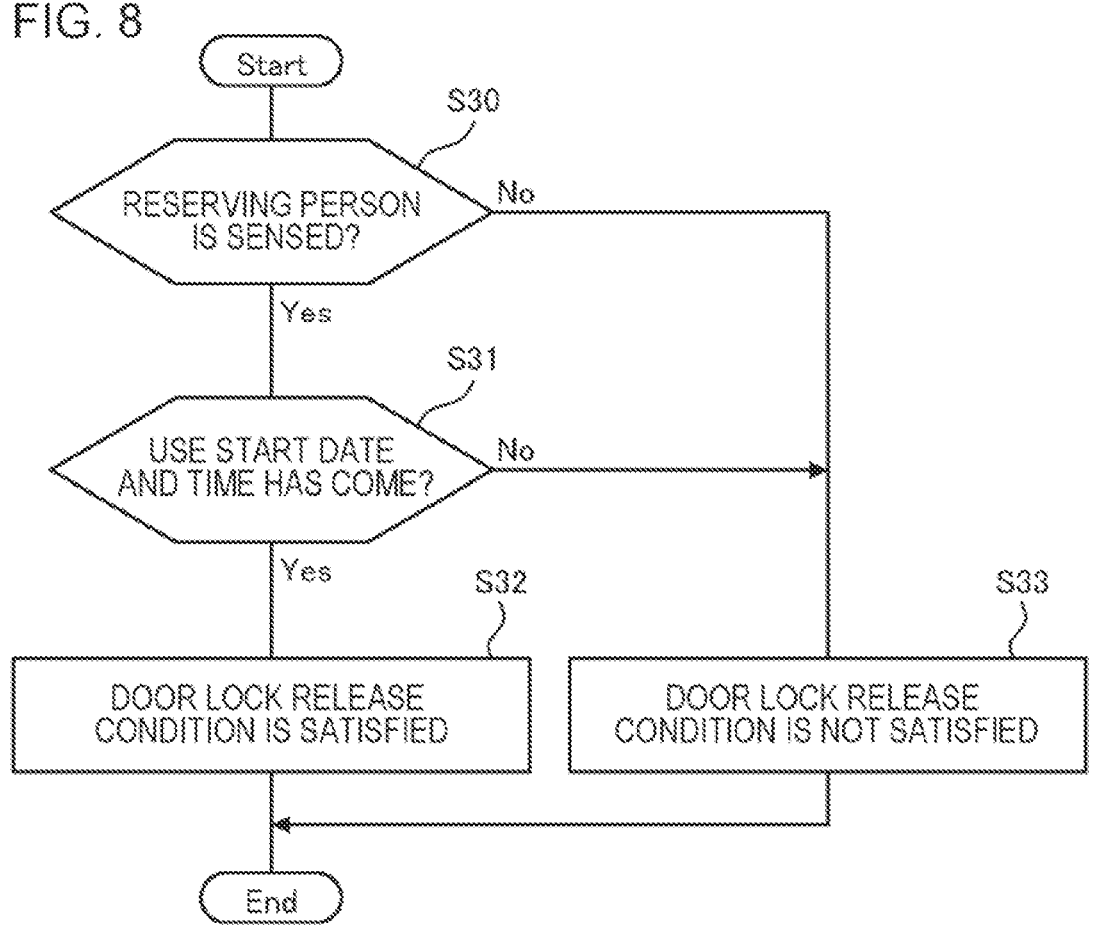
FIG. 8 is a flowchart illustrating one example of a flow of processing of the door lock control apparatus according to the present example embodiment.

Herein, another example of determination in S11 is described with reference to a flowchart in FIG. 8.

The on-site sensing unit 12 determines whether the reserving person 5 is present on the site 1, based on a face image of the reserving person 5 registered in advance or a feature value thereof, and an on-site image. When it is sensed that the reserving person 5 is present on the site 1 (Yes in S30), and a current date and time has passed the use start date and time registered in advance (Yes in S31), the door lock release condition is satisfied (S32). On the other hand, when it is not sensed that the reserving person 5 is present on the site (No in S30), or when a current date and time does not reach the use start date and time registered in advance (No in S31), the door lock release condition is not satisfied (S33).

"Configuration of In-vehicle Apparatus 4"

Figure 9:
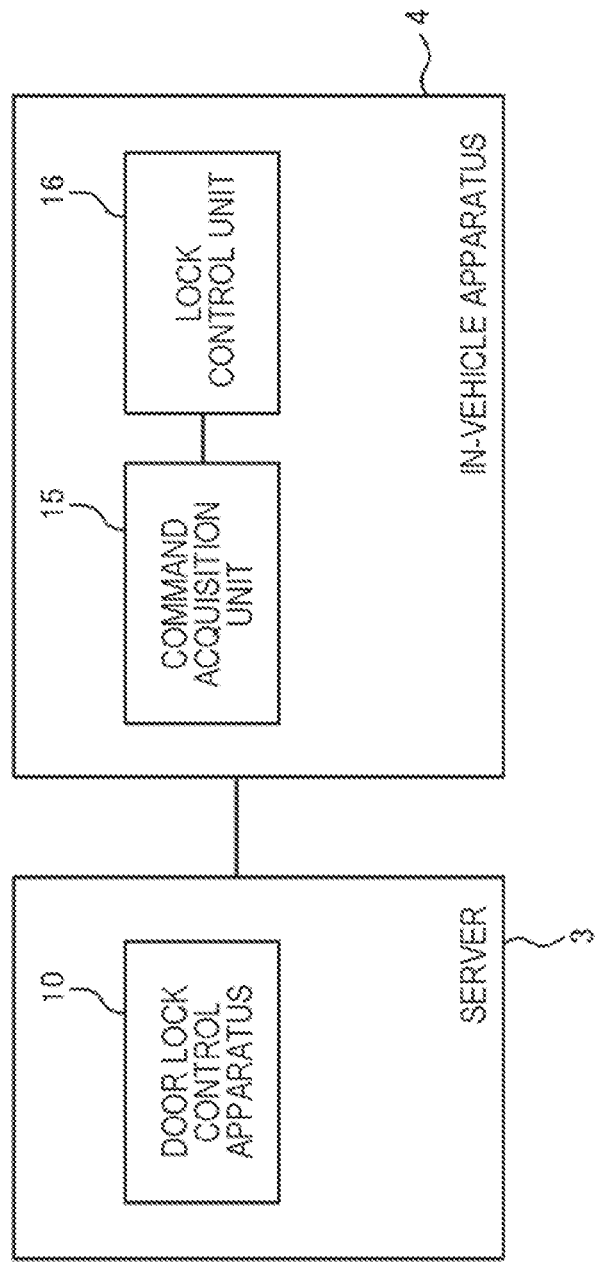
FIG. 9 is one example of a functional block diagram of the car sharing system according to the present example embodiment.

Next, a configuration of the in-vehicle apparatus 4 is described in detail. The in-vehicle apparatus 4 is, for example, an electronic control unit (ECU). FIG. 9 illustrates one example of a functional block diagram of the in-vehicle apparatus 4. As illustrated in FIG. 9, the in-vehicle apparatus 4 includes a command acquisition unit 15 and a lock control unit 16.

Each functional unit included in the in-vehicle apparatus 4 is achieved by any combination of hardware and software, mainly including a CPU of any computer, a memory, a program loaded in a memory, a storage unit (capable of storing, in addition to a program stored in advance at a shipping stage of an apparatus, a program downloaded from a storage medium such as a CD, a server on the Internet, and the like) such as a hard disk storing the program, and an interface for network connection. It is understood by a person skilled in the art that there are various modification examples as a method and an apparatus of achieving the configuration. One example of a hardware configuration of the in-vehicle apparatus 4 is illustrated in FIG. 3 similarly to the door lock control apparatus 10.

Next, referring back to FIG. 9, a configuration of each functional unit is described in detail.

The command acquisition unit 15 acquires, from an external apparatus, a command of releasing a door lock. Specifically, the command acquisition unit 15 acquires the command output from the release command output unit 13 of the door lock control apparatus 10.

When the command acquisition unit 15 acquires a command of releasing a door lock, the lock control unit 16 releases the door lock of the vehicle 6 in response to the acquisition.

Modification Example of Present Example Embodiment

The camera 2 may be provided in an operation terminal installed on the site 1. When a predetermined capturing condition is satisfied, the camera 2 may capture one or a plurality of still images. As the capturing condition, inputting a capturing command to the operation terminal, sensing a person in front of the operation terminal, and the like are exemplified, but the capturing condition is not limited thereto.

Further, a face image of a user may be registered at a time of making a use reservation of the vehicle 6. In this case, a face image of a user and a feature value thereof are not included in the user registration information (FIG. 4) but included in the reservation information (FIG. 5).

Further, when a door lock is released in response to a command from the door lock control apparatus 10, the in-vehicle apparatus 4 may turn on, blink, or the like a predetermined light (such as a headlight, a small light, a blinker, a fog light, a tail light, a brake light, a back light, a light for illuminating a number plate, and a car interior light) for a short time. Thus, in a case where a plurality of vehicles are present on the site 1, the reserving person 5 can easily recognize which one is a vehicle reserved by himself/herself.

"Advantageous Effect"

In the car sharing system according to the present example embodiment described above, when the reserving person 5 appears on the site 1, a door lock of the reserved vehicle 6 is automatically released (without an operation of the reserving person 5). In the car sharing system as described above, it is possible to reduce a burden of a user for door lock release. Consequently, a car sharing service having high convenience is achieved.

Further, in the car sharing system according to the present example embodiment, when the reserving person 5 appears on the site 1, and a use start date and time registered in advance has come, a door lock of the reserved vehicle 6 is automatically released (without an operation of the reserving person 5). In the car sharing system as described above, it is possible to suppress an inconvenience that a door lock of the vehicle 6 is released at a time other than the use time registered in advance. Consequently, it is possible to suppress illegal use of the vehicle 6 at a time other than the reservation time registered in advance.

Second Example Embodiment

Figure 10:
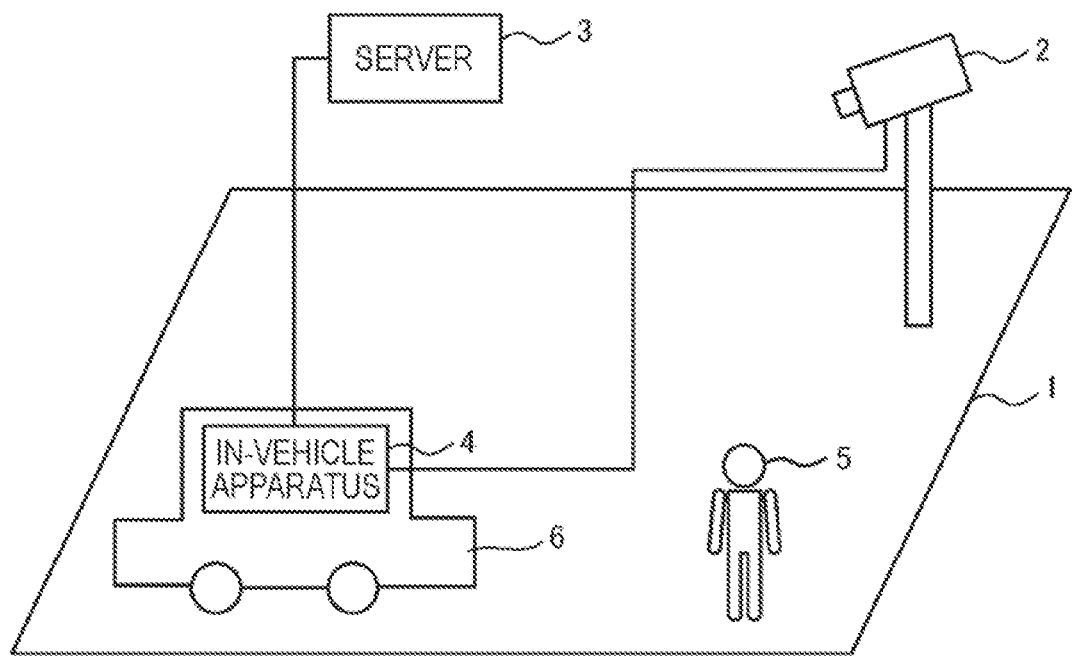
FIG. 10 is one example of a functional block diagram of a car sharing system according to the present example embodiment.

As illustrated in a functional block diagram in FIG. 10, in a car sharing system according to a present example embodiment, a server 3 and an in-vehicle apparatus 4 are configured to be communicable with each other. Further, a camera 2 and the in-vehicle apparatus 4 are configured to be communicable with each other.

Figure 11:
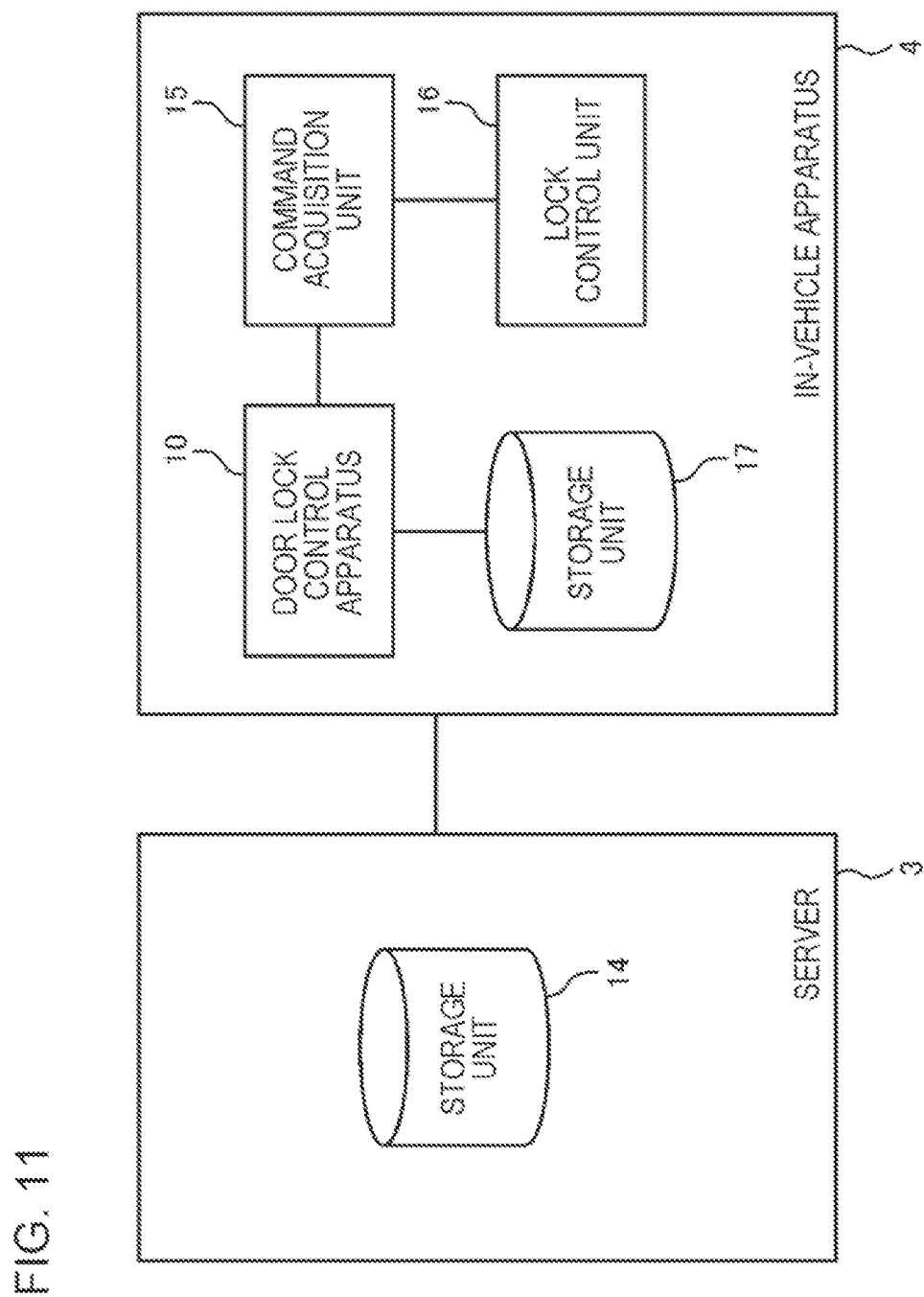
FIG. 11 is one example of a functional block diagram of the car sharing system according to the present example embodiment.

As illustrated in a functional block diagram in FIG. 11, in the car sharing system according to the present example embodiment, the in-vehicle apparatus 4 includes a door lock control apparatus 10. Not the door lock control apparatus 10 but the server 3 includes a storage unit 14.

The in-vehicle apparatus 4 acquires, from the server 3, reservation information relating to an own vehicle, and at least a part of user registration information of a user who made a reservation of the own vehicle, and causes a storage unit 17 of an own apparatus to store the information. FIG. 12 schematically illustrates one example of information stored in the storage unit 17. The illustrated example includes reservation date and time indicating a use start date and time and a use end date and time of an own vehicle, reserving person information indicating a name, a face image, a feature value of the face image, and the like of a reserving person, and driver information indicating a name, a face image, a feature value of the face image, and the like of a driver other than the reserving person. Note that, the information stored in the storage unit 17 may include other information, or may not include a part of pieces of the exemplified information.

Other configuration of the car sharing system according to the present example embodiment is similar to that of the first example embodiment.

In the car sharing system according to the present example embodiment, an advantageous effect similar to the first example embodiment is achieved. Further, in the car sharing system according to the present example embodiment, since each in-vehicle apparatus 4 mounted in each vehicle 6 performs door lock control of an own vehicle, it is possible to reduce a burden of the server 3.

Third Example Embodiment

Figure 13:
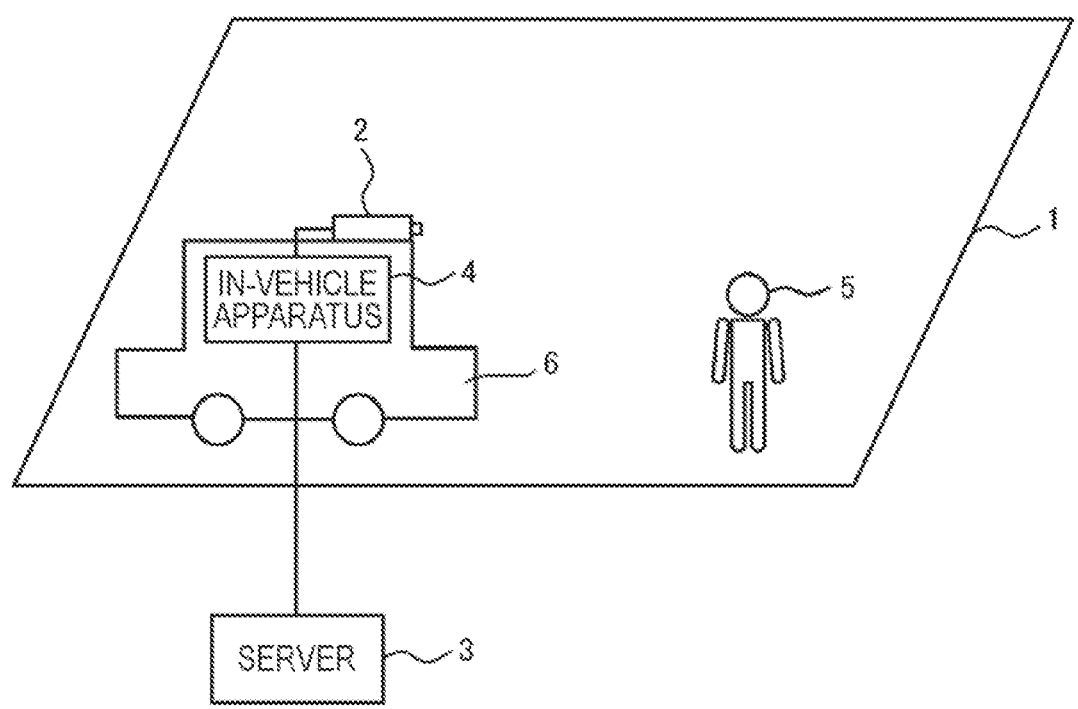
FIG. 13 is a diagram schematically illustrating one example of information to be processed by the car sharing system according to the present example embodiment.

As illustrated in a functional block diagram in FIG. 13, a car sharing system according to a present example embodiment is different from that of the second example embodiment in a point that a camera 2 is mounted in each vehicle 6. The camera 2 to be mounted in the vehicle 6 may be one or plural. Other configuration of the car sharing system according to the present example embodiment is similar to that of the second example embodiment.

In the car sharing system according to the present example embodiment, an advantageous effect similar to the first and second example embodiments is achieved.

Fourth Example Embodiment

When a door lock of a vehicle 6 is released in response to sensing presence of a reserving person 5 on a site 1, based on an on-site image generated by a camera 2, there is a case that a timing of releasing a door lock is too early. For example, such a situation may occur in a case where the site 1 is large to some extent, and a distance between a position where the vehicle 6 is present, and a capturing area of the camera 2 is far, and the like. When a timing of releasing a door lock is too early, an inconvenience such as illegal use by another person may occur.

In order to eliminate the inconvenience, a car sharing system according to a present example embodiment includes a means for releasing a door lock after a predetermined time elapses after presence of a reserving person 5 on the site 1 is sensed based on an on-site image generated by the camera 2. Specifically, the car sharing system according to the present example embodiment achieves one of following first to third delay methods.

"First Delay Method"

In a case of this method, when an on-site sensing unit 12 senses that the reserving person 5 is present on the site 1, a release command output unit 13 of a door lock control apparatus 10 outputs a command of releasing a door lock in response to the sensing. The command indicates that a door lock is released after a predetermined time elapses after acquisition of the command.

Figure 14:
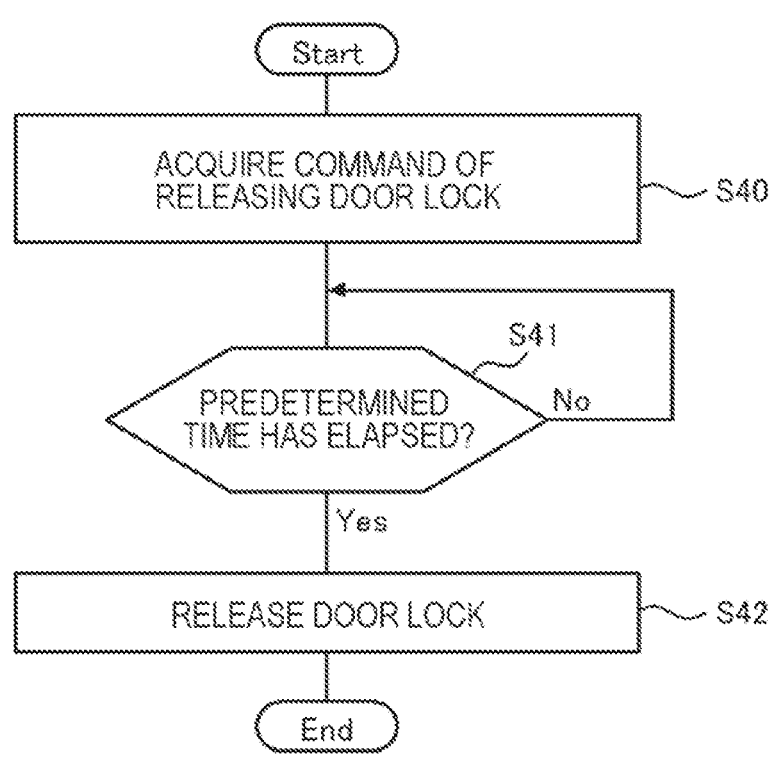
FIG. 14 is a flowchart illustrating one example of a flow of processing of an in-vehicle apparatus according to the present example embodiment.

As illustrated in a flowchart in FIG. 14, after a command acquisition unit 15 acquires the command (S40), when it is sensed that a predetermined time has elapsed (Yes in S41), a lock control unit 16 of an in-vehicle apparatus 4 releases a door lock of the vehicle 6 in response to the sensing (S42).

Note that, the predetermined time may be a fixed value being determined in advance, or may be determined for each reservation by the release command output unit 13.

For example, the release command output unit 13 may determine the predetermined time, based on at least one of information relating to the reserving person 5, a position of the reserving person 5 on the site 1, information relating to the reserved vehicle 6, and a position of the reserved vehicle 6 on the site 1. Specifically, the release command output unit 13 may include one of following first to third predetermined time determination means.

'First Predetermined Time Determination Means'

In a case of this means, the release command output unit 13 determines a position of the reserving person 5 on the site 1, and a position of the reserved vehicle 6 on the site 1, based on an on-site image. Then, the release command output unit 13 computes a distance between the reserving person 5 and the vehicle 6, based on the determined positions of the reserving person 5 and the vehicle 6. Then, the release command output unit 13 sets, as the above-described predetermined time, a moving time computed by dividing the computed "distance" by a "moving speed of a person registered in advance".

'Second Predetermined Time Determination Means'

In a case of this means, a moving speed is registered for each user. Then, the release command output unit 13 sets, as the above-described predetermined time, a moving time computed by dividing a "distance" computed by a method similar to the first predetermined time determination means by a "moving speed of the reserving person 5 registered in advance".

Note that, the moving speed of each user to be registered may be based on a content declared by a user (example: a content selected from among "fast:V1 [m/s]", "normal:V2 [m/s]", and "slow:V3 [m/s]"), or may be a moving speed measured at a time of use by each user in the past. Measurement of the moving speed may be achieved based on an on-site image generated by the camera 2, or may be other than the above. 'Third Predetermined Time Determination Means'

In a case of this means, a statistical value (such as an average value, a most frequent value, a maximum value, a minimum value, and a median value) of a moving speed of a user using each vehicle 6 is registered for each vehicle 6. Then, the release command output unit 13 sets, as the above-described predetermined time, a moving time computed by dividing a "distance" computed by a method similar to the first predetermined time determination means by a "statistical value of a moving speed of a user registered in advance and using the vehicle 6".

Note that, a moving speed of each user can be computed by a method similar to the second predetermined time determination means.

"Second Delay Method"

Figure 15:
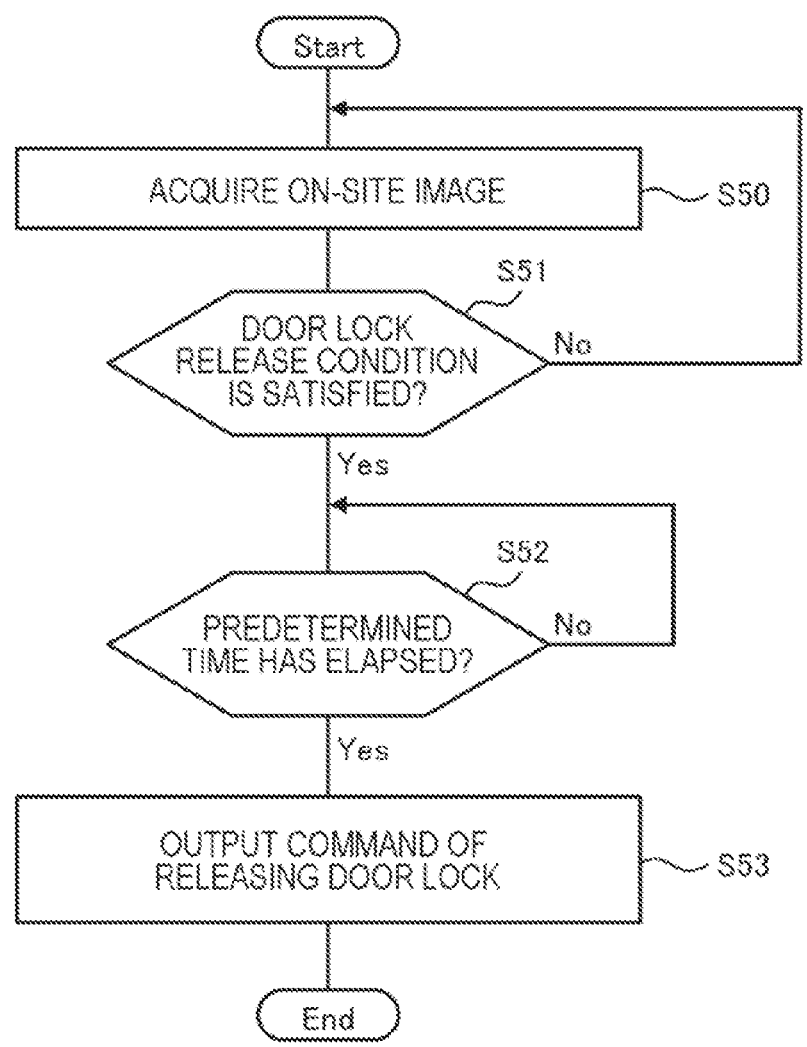
FIG. 15 is a flowchart illustrating one example of a flow of processing of the door lock control apparatus according to the present example embodiment.
Figure 16:
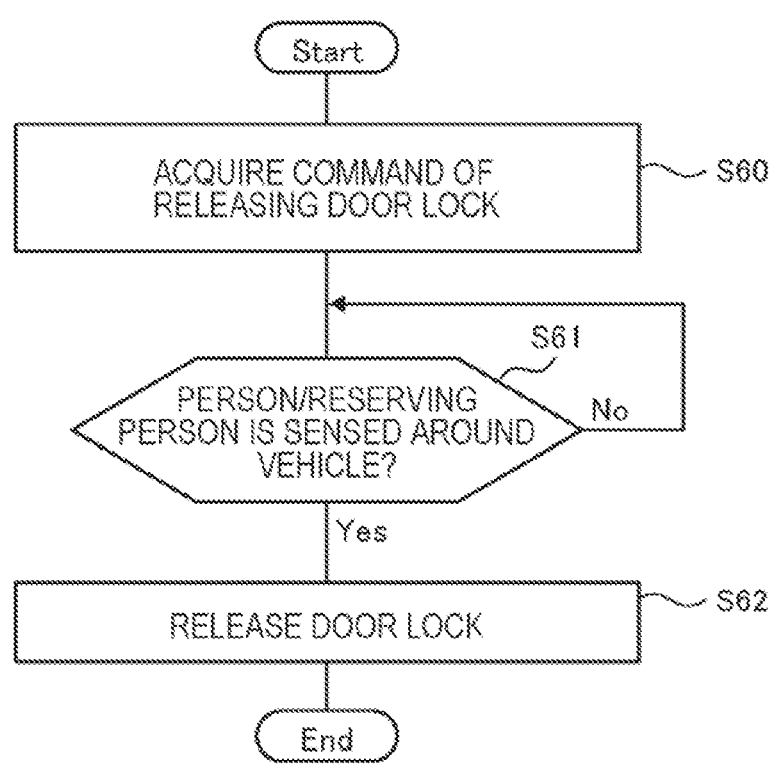
FIG. 16 is a flowchart illustrating one example of a flow of processing of the in-vehicle apparatus according to the present example embodiment.

In a case of this method, as illustrated in a flowchart in FIG. 15, after a condition (door lock release condition) of outputting a command of releasing a door lock of the reserved vehicle 6 is satisfied (Yes in S51), when it is sensed that a predetermined time has elapsed (Yes in S52), the release command output unit 13 of the door lock control apparatus 10 outputs a command of releasing a door lock of the reserved vehicle 6 (S53).

When the command acquisition unit 15 acquires the command, the lock control unit 16 of the in-vehicle apparatus 4 releases a door lock of the vehicle 6 in response to the acquisition.

Note that, the predetermined time may be a fixed value that is determined in advance, or may be determined for each reservation by the release command output unit 13. A means for determining the predetermined time by the release command output unit 13 is similar to the one described in the first delay means.

"Third Delay Method"

In a case of this method, after the command acquisition unit 15 of the in-vehicle apparatus 4 acquires a command of releasing a door lock (S60), when a person or a reserving person is sensed around the vehicle 6 (Yes in S61), the lock control unit 16 releases a door lock of the vehicle 6 (S62). The in-vehicle apparatus 4 achieves sensing of a person or a reserving person around the vehicle 6, based on information collected by an information collecting apparatus included in the vehicle 6. As the information collecting apparatus, a camera, a lidar sensor, and the like are exemplified, but the information collecting apparatus is not limited thereto.

Other configuration of the car sharing system according to the present example embodiment is similar to those of the first to third example embodiments.

In the car sharing system according to the present example embodiment, an advantageous effect similar to the first to third example embodiments is achieved. Further, in the car sharing system according to the present example embodiment, it is possible to release a door lock of the vehicle 6 after elapse of a predetermined time after sensing presence of the reserving person 5 on the site 1, based on an on-site image generated by the camera 2. Therefore, it is possible to suppress an inconvenience that a timing of door lock release is too early.

Fifth Example Embodiment

Figure 17:
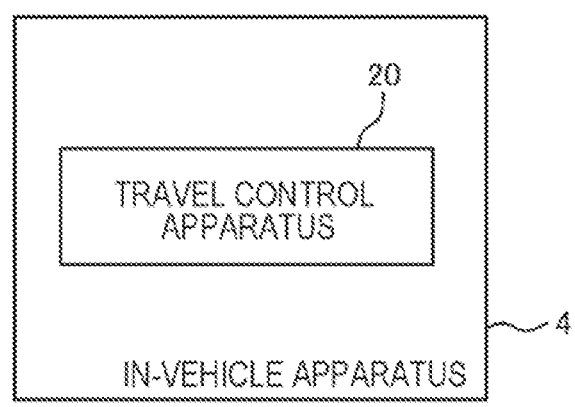
FIG. 17 is one example of a functional block diagram of the in-vehicle apparatus according to the present example embodiment.

A car sharing system according to a present example embodiment has a function of restricting use (such as traveling) of a vehicle 6 in a state that a reserving member (reserving person 5) has not got on the vehicle 6. Specifically, as illustrated in a functional block diagram in FIG. 17, an in-vehicle apparatus 4 according to the present example embodiment includes a travel control apparatus 20. When sensing the reserving person 5 within the vehicle compartment, based on an in-vehicle image generated by a camera for capturing the inside of the vehicle compartment, the travel control apparatus 20 outputs travel permission of the vehicle 6. When travel permission is acquired, traveling of the vehicle 6 is enabled.

Note that, although not illustrated, the in-vehicle apparatus 4 may include a command acquisition unit 15 and a lock control unit 16. Further, the in-vehicle apparatus 4 may further include a door lock control apparatus 10 and a storage unit 17.

Figure 18:
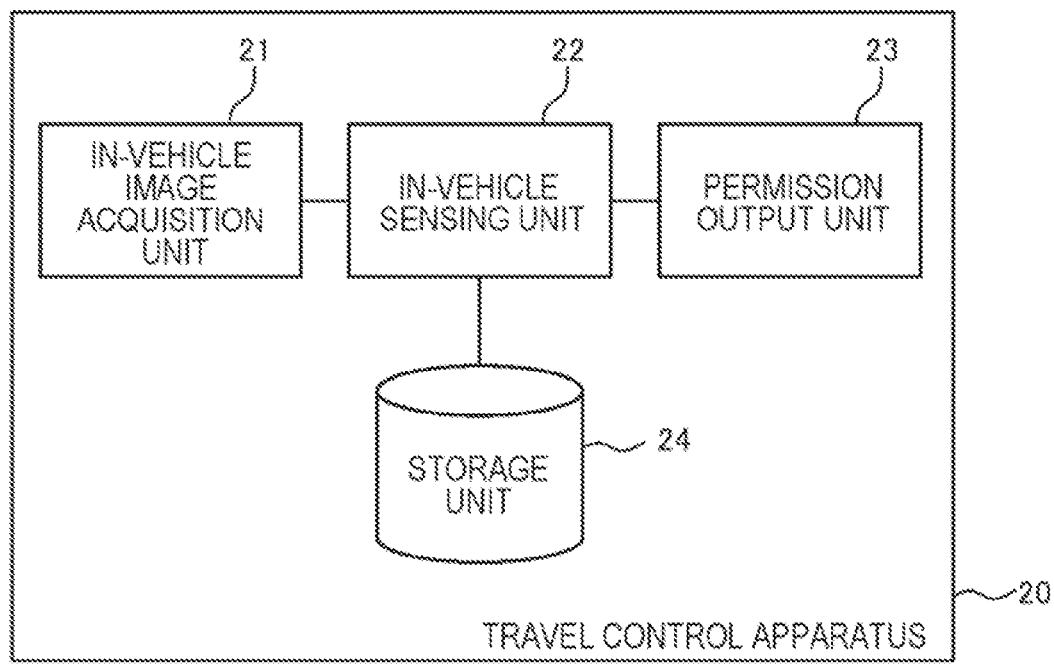
FIG. 18 is one example of a functional block diagram of a travel control apparatus according to the present example embodiment.

FIG. 18 illustrates one example of a functional block diagram of the travel control apparatus 20. As illustrated in FIG. 18, the travel control apparatus 20 includes an in-vehicle image acquisition unit 21, an in-vehicle sensing unit 22, a permission output unit 23, and a storage unit 24.

Each functional unit included in the travel control apparatus 20 is achieved by any combination of hardware and software, mainly including a CPU of any computer, a memory, a program loaded in a memory, a storage unit (capable of storing, in addition to a program stored in advance at a shipping stage of an apparatus, a program downloaded from a storage medium such as a CD, a server on the Internet, and the like) such as a hard disk storing the program, and an interface for network connection. It is understood by a person skilled in the art that there are various modification examples as a method and an apparatus of achieving the configuration. One example of a hardware configuration of the travel control apparatus 20 is illustrated in FIG. 3 similarly to the door lock control apparatus 10.

Next, referring back to FIG. 18, a configuration of each functional unit is described in detail.

The storage unit 24 is a storage unit included in the in-vehicle apparatus 4, and stores information similar to the information stored in the storage unit 17 described in the second example embodiment. Specifically, as illustrated in FIG. 12, the storage unit 24 includes a reservation date and time indicating a use start date and time and a use end date and time of an own vehicle, reserving person information indicating a name, a face image, a feature value of the face image, and the like of a reserving person, and driver information indicating a name, a face image, a feature value of the face image, and the like of a driver other than the reserving person. Note that, the in-vehicle apparatus 4 may include either of the storage unit 17 and the storage unit 24, and does not have to include both of the units.

The in-vehicle image acquisition unit 21 acquires an in-vehicle image generated by a camera (hereinafter, an "in-vehicle camera") for capturing the inside of the vehicle compartment of the reserved vehicle 6. The in-vehicle camera is set at a position, an orientation, and setting capable of generating an image that enables to accurately recognize a person seated in a seat by face recognition processing. One in-vehicle camera may be installed or a plurality of in-vehicle cameras may be installed inside the vehicle compartment. The in-vehicle camera may successively capture a moving image, or may capture a still image every predetermined time interval that is relatively short. Further, when a predetermined capturing condition is satisfied, the in-vehicle camera may capture a still image in response to the result. As the capturing condition, "a door of a driver's seat is closed after opened", "all the doors are closed after at least one of the doors is opened", "an accessory power supply (ACC power supply) of the vehicle 6 is turned on", "an ignition power supply (IG power supply) of the vehicle 6 is turned on", "a startup operation (such as an engine startup operation and a motor startup operation) of the vehicle 6 is accepted", and the like are exemplified, but the capturing condition is not limited thereto.

The in-vehicle sensing unit 22 senses that the reserving person 5 is present within the reserved vehicle 6 by face recognition processing based on an in-vehicle image acquired by the in-vehicle image acquisition unit 21, and a face image or a feature value thereof of the reserving person 5 registered in advance and stored in the storage unit 24.

When it is sensed that the reserving person 5 is present within the vehicle 6, the permission output unit 23 outputs travel permission of the vehicle 6. The in-vehicle apparatus 4 starts an engine or a motor of the vehicle 6 in response to a startup operation (such as an engine startup operation and a motor startup operation) of the vehicle 6 in a state of presence of travel permission.

Note that, presence of a key of the vehicle 6 may be additionally requested to start an engine or a motor. For example, "presence of a key in an area wirelessly communicable with the in-vehicle apparatus 4", "insertion of a key to a predetermined position of the vehicle 6", and the like may be a condition of starting an engine or a motor. In addition to the above, starting an engine or a motor in a keyless manner may be enabled. In this case, for example, the in-vehicle apparatus 4 may perform biometric authentication using biometric information (such as a face image, a fingerprint, a voiceprint, and an iris). Then, a success of biometric authentication may be additionally requested to start an engine or a motor.

Next, one example of a flow of processing of the travel control apparatus 20 is described with reference to flowcharts in FIGS. 19 and 20.

First Example

When a predetermined capturing start condition is satisfied, the in-vehicle image acquisition unit 21 transmits, to the in-vehicle camera, a capturing start request for the inside of the vehicle compartment. In response to the capturing start request, the in-vehicle camera starts capturing the inside of the vehicle compartment. In the example, the in-vehicle camera successively captures a moving image, or successively captures a still image every predetermined time interval that is relatively short. As a capturing start condition, "an accessory power supply (ACC power supply) of the vehicle 6 is turned on", "an ignition power supply (IG power supply) of the vehicle 6 is turned on", and the like are exemplified, but the capturing start condition is not limited thereto. As a capturing end condition, "an accessory power supply (ACC power supply) of the vehicle 6 is turned off", "an ignition power supply (IG power supply) of the vehicle 6 is turned off", and the like are exemplified, but the capturing end condition is not limited thereto.

Figure 19:
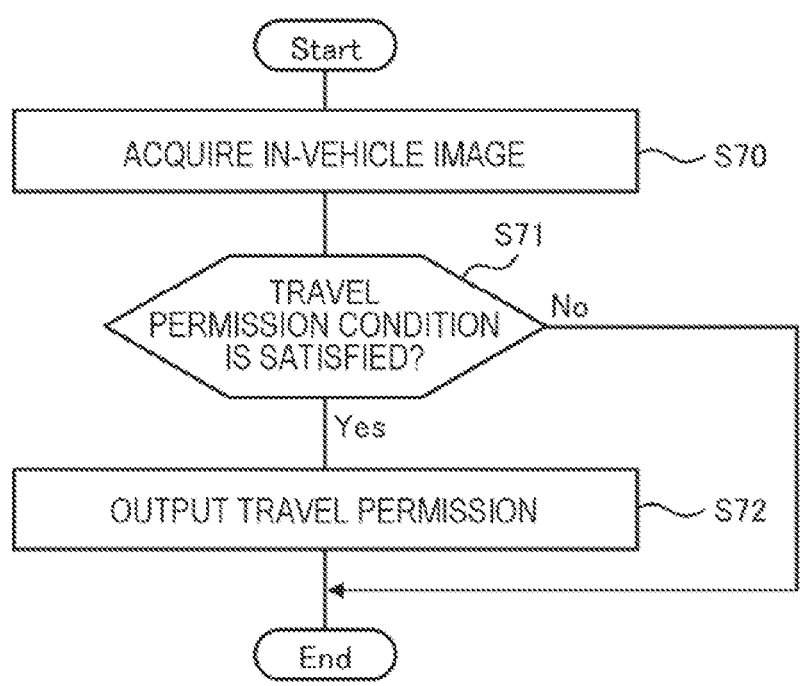
FIG. 19 is a flowchart illustrating one example of a flow of processing of the travel control apparatus according to the present example embodiment.
Figure 20:
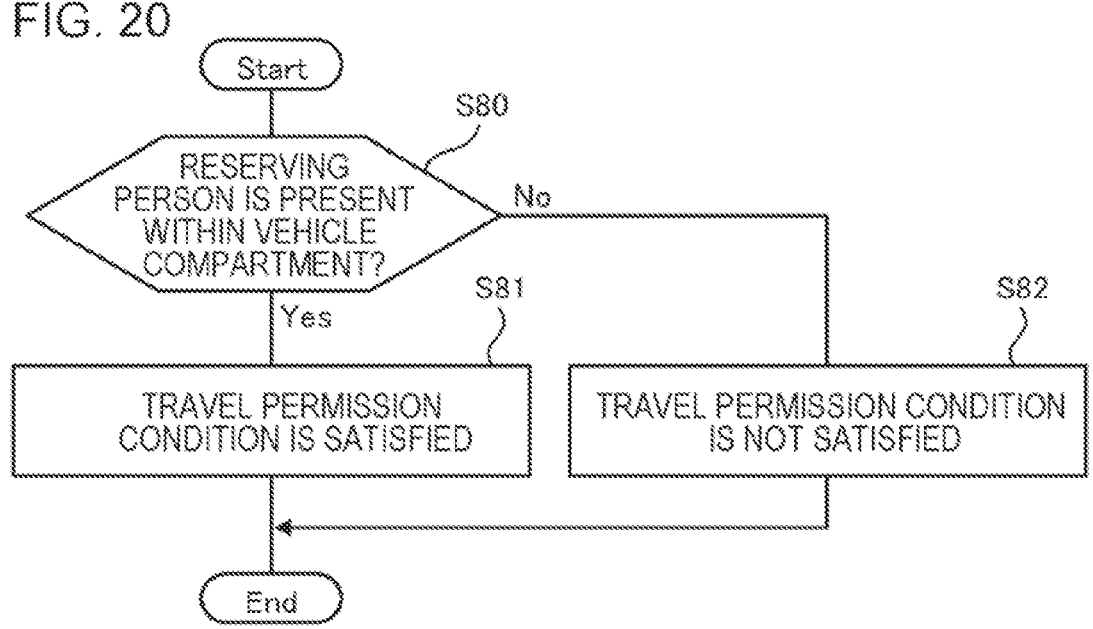
FIG. 20 is a flowchart illustrating one example of a flow of processing of the travel control apparatus according to the present example embodiment.

As illustrated in the flowchart in FIG. 19, after the in-vehicle image acquisition unit 21 acquires an in-vehicle image generated by the in-vehicle camera (S70), the in-vehicle sensing unit 22 determines whether a travel permission condition is satisfied, based on the in-vehicle image (S71).

Herein, one example of a flow of processing of determination in S71 is described with reference to the flowchart in FIG. 20. The in-vehicle sensing unit 22 determines whether the reserving person 5 is present within the vehicle 6 by face recognition processing based on an in-vehicle image acquired by the in-vehicle image acquisition unit 21, and a face image or a feature value thereof of the reserving person 5 registered in advance and stored in the storage unit 24 (S80).

When the reserving person 5 is present within the vehicle 6 (Yes in S80), the travel permission condition is satisfied (S81). On the other hand, when the reserving person 5 is not present within the vehicle 6 (No in S80), the travel permission condition is not satisfied (S82).

Referring back to the flowchart in FIG. 19, when the travel permission condition is satisfied (Yes in S71), the permission output unit 23 outputs travel permission of the vehicle 6 (S72). On the other hand, when the travel permission condition is not satisfied (No in S71), the permission output unit 23 does not output travel permission of the vehicle 6.

Note that, the travel control apparatus 20 may continue sensing of the reserving person 5 within the vehicle compartment, based on an in-vehicle image, until an engine or a motor of the vehicle 6 is started. Then, after travel permission is output, when the reserving person 5 cannot be sensed within the vehicle compartment, the travel control apparatus 20 may perform output of cancelling travel permission.

Although not illustrated, when accepting a startup operation (such as an engine startup operation and a motor startup operation) of the vehicle 6 in a state that travel permission is issued ("a state that travel permission is output", "a state that output of cancelling travel permission is not performed, after travel permission is output"), the in-vehicle apparatus 4 causes the engine or the motor of the vehicle 6 to start.

Second Example

When a predetermined capturing condition is satisfied, the in-vehicle image acquisition unit 21 transmits, to the in-vehicle camera, a capturing request for the inside of the vehicle compartment. The in-vehicle camera captures the inside of the vehicle compartment in response to the capturing request, and generates one or a plurality of still images (in-vehicle images). The capturing condition is "accepting a startup operation (such as an engine startup operation and a motor startup operation) of the vehicle 6".

As illustrated in the flowchart in FIG. 19, after the in-vehicle image acquisition unit 21 acquires an in-vehicle image generated by the in-vehicle camera (S70), the in-vehicle sensing unit 22 determines whether a travel permission condition is satisfied, based on the in-vehicle image (S71). A flow of processing of determination in S71 is illustrated in a flowchart in FIG. 20. Note that, since description on the flowchart in FIG. 20 is described above, description thereof is omitted herein.

When the travel permission condition is satisfied (Yes in S71), the permission output unit 23 outputs travel permission of the vehicle 6 (S72). Although not illustrated, the in-vehicle apparatus 4 causes the engine or the motor of the vehicle 6 to start in response to the output.

On the other hand, when the travel permission condition is not satisfied (No in S71), the permission output unit 23 does not output travel permission of the vehicle 6. In this case, the in-vehicle apparatus 4 does not cause the engine or the motor of the vehicle 6 to start. The in-vehicle apparatus 4 may perform error notification indicating that the engine or the motor cannot be started since the reserving person 5 is not present within the vehicle compartment. The error notification is performed toward a person present within the vehicle compartment. The error notification is achieved via all possible output apparatuses such as a display, a speaker, and a lamp.

Third Example

When a predetermined capturing condition is satisfied, the in-vehicle image acquisition unit 21 transmits, to the in-vehicle camera, a capturing request for the inside of the vehicle compartment. The in-vehicle camera captures the inside of the vehicle compartment in response to the capturing request, and generates one or a plurality of still images (in-vehicle images). The capturing condition is "a door of a driver's seat is closed after opened", "all the doors are closed after at least one of the doors is opened", "an accessory power supply (ACC power supply) of the vehicle 6 is turned on", "an ignition power supply (IG power supply) of the vehicle 6 is turned on", and the like.

As illustrated in the flowchart in FIG. 19, after the in-vehicle image acquisition unit 21 acquires an in-vehicle image generated by the in-vehicle camera (S70), the in-vehicle sensing unit 22 determines whether a travel permission condition is satisfied, based on the in-vehicle image (S71). A flow of processing of determination in S71 is illustrated in the flowchart in FIG. 20. Note that, since description on the flowchart in FIG. 20 is described above, description thereof is omitted herein.

When the travel permission condition is satisfied (Yes in S71), the permission output unit 23 outputs travel permission of the vehicle 6 (S72). On the other hand, when the travel permission condition is not satisfied (No in S71), the permission output unit 23 does not output travel permission of the vehicle 6.

Note that, the travel control apparatus 20 may perform the above-described processing each time the above-described capturing condition is satisfied, until an engine or a motor of the vehicle 6 is started. Then, after travel permission is output, when the reserving person 5 cannot be sensed within the vehicle compartment, the travel control apparatus 20 may perform output of cancelling travel permission.

Although not illustrated, when accepting a startup operation (such as an engine startup operation and a motor startup operation) of the vehicle 6 in a state that travel permission is issued ("a state that travel permission is output", "a state that output of cancelling travel permission is not performed, after travel permission is output"), the in-vehicle apparatus 4 causes the engine or the motor of the vehicle 6 to start.

Note that, the car sharing system according to the present example embodiment may have a configuration similar to the first to fourth example embodiments.

As described above, in the car sharing system according to the present example embodiment, in a case where a configuration similar to the first to fourth example embodiments is provided, an advantageous effect similar to those of example embodiments is achieved.

Further, in the car sharing system according to the present example embodiment, when sensing the reserving person 5 within the vehicle compartment, based on an in-vehicle image generated by the camera for capturing the inside of the vehicle compartment, the travel control apparatus 20 outputs travel permission of the vehicle 6. When travel permission is output, the vehicle 6 is allowed to start the engine or the motor, and is brought to a travelable state. In a case of the car sharing system according to the present example embodiment as described above, when the reserving person 5 is not sensed within the vehicle compartment, the vehicle 6 is not brought to a travelable state. Therefore, it is possible to advantageously restrict use of the vehicle 6 in a state that the reserving person 5 has not got on the vehicle 6.

Sixth Example Embodiment

A travel control apparatus 20 according to a present example embodiment has a function of restricting use of a vehicle 6 by driving of a person other than a reserving member (reserving person 5) or a driver registered in advance.

One example of a functional block diagram of the travel control apparatus 20 is illustrated in FIG. 18 similarly to the fifth example embodiment.

An in-vehicle sensing unit 22 senses that the reserving person 5 is seated in a driver's seat of the vehicle 6, based on an in-vehicle image. A means for achieving the sensing is not specifically limited, and hereinafter, one example is described.

For example, one of in-vehicle cameras may be installed at a position and an orientation of capturing only a person seated in a driver's seat. Then, the in-vehicle sensing unit 22 may sense that the reserving person 5 is seated in the driver's seat by face recognition processing based on an in-vehicle image generated by the in-vehicle camera, and a face image or a feature value thereof of the reserving person 5 registered in advance and stored in a storage unit 24.

In addition to the above, one of the in-vehicle cameras may be installed at a position and an orientation of capturing an entirety of the inside of the vehicle compartment including the driver's seat. Then, an area where a face of a person seated in the driver's seat is supposed to be present within an in-vehicle image generated by the in-vehicle camera may be registered in advance. Then, the in-vehicle sensing unit 22 may sense that the reserving person 5 is seated in the driver's seat by face recognition processing based on an image within the registered area of the in-vehicle image generated by the in-vehicle camera, and a face image or a feature value thereof of the reserving person 5 registered in advance and stored in the storage unit 24.

Further, the in-vehicle sensing unit 22 senses that a driver other than the reserving person 5 registered in advance is seated in the driver's seat, based on an in-vehicle image. The sensing can be achieved similarly to sensing that the reserving person 5 is seated in the driver's seat of the vehicle 6.

When sensing that the reserving person 5 is seated in the driver's seat, a permission output unit 23 outputs travel permission of the reserved vehicle 6.

Further, in a case where it is sensed that a driver other than the reserving person 5 registered in advance is seated in the driver's seat, when it is sensed that the reserving person 5 is present within the vehicle compartment of the vehicle 6, the permission output unit 23 outputs travel permission of the reserved vehicle 6. Specifically, when it is sensed that the reserving person 5 is present within the vehicle compartment of the reserved vehicle 6, and it is sensed that a driver registered in advance is seated in the driver's seat, the permission output unit 23 outputs travel permission of the reserved vehicle 6.

Figure 21:
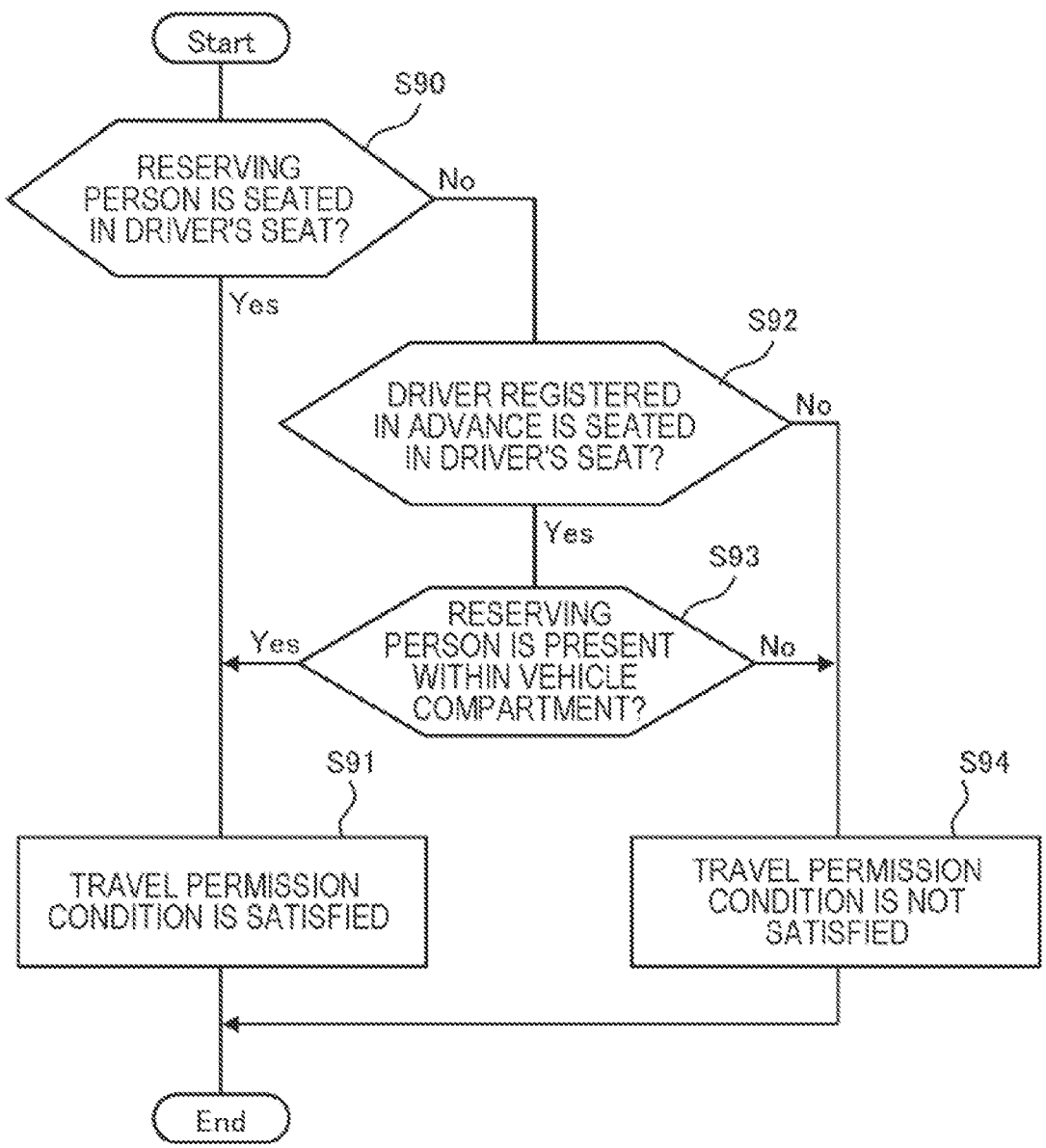
FIG. 21 is a flowchart illustrating one example of a flow of processing of the travel control apparatus according to the present example embodiment.

One example of a flow of processing of the travel control apparatus 20 according to the present example embodiment is substantially similar to the first to third examples described in the fifth example embodiment, but a flow of processing of determination in S71 in FIG. 19 as to whether the travel permission condition is satisfied is different. Hereinafter, one example of a flow of processing of determination in S71 in FIG. 19 is described with reference to a flowchart in FIG. 21.

The in-vehicle sensing unit 22 determines whether the reserving person 5 is seated in the driver's seat of the vehicle 6 by face recognition processing based on an in-vehicle image acquired by an in-vehicle image acquisition unit 21, and a face image or a feature value thereof of the reserving person 5 registered in advance and stored in the storage unit 24 (S90).

When the reserving person 5 is seated in the driver's seat of the vehicle 6 (Yes in S90), the travel permission condition is satisfied (S91).

On the other hand, when the reserving person 5 is not seated in the driver's seat of the vehicle 6 (No in S90), the in-vehicle sensing unit 22 determines whether a driver other than the reserving person 5 registered in advance is seated in the driver's seat of the vehicle 6 by face recognition processing based on an in-vehicle image acquired by the in-vehicle image acquisition unit 21, and a face image or a feature value thereof of the driver other than the reserving person 5 registered in advance and stored in the storage unit 24 (S92).

When the driver other than the reserving person 5 registered in advance is not seated in the driver's seat of the vehicle 6 (No in S92), the travel permission condition is not satisfied (S94).

On the other hand, when the driver other than the reserving person 5 registered in advance is seated in the driver's seat of the vehicle 6 (Yes in S92), the in-vehicle sensing unit 22 determines whether the reserving person 5 is present within the vehicle compartment of the vehicle 6 by face recognition processing based on an in-vehicle image acquired by the in-vehicle image acquisition unit 21, and a face image or a feature value thereof of the reserving person 5 registered in advance and stored in the storage unit 24 (S93).

When the reserving person 5 is present within the vehicle compartment of the vehicle 6 (Yes in S93), the travel permission condition is satisfied (S91). On the other hand, when the reserving person 5 is not present within the vehicle compartment of the vehicle 6 (No in S93), the travel permission condition is not satisfied (S94).

Other configuration of the car sharing system according to the present example embodiment is similar to that of the fifth example embodiment.

As described above, in the car sharing system according to the present example embodiment, an advantageous effect similar to the fifth example embodiment is achieved. Further, in the car sharing system according to the present example embodiment, it is possible to advantageously restrict use of the vehicle 6 by driving of a person other than the reserving person 5 or a driver registered in advance.

Seventh Example Embodiment

In the travel control apparatus 20 according to the fifth and sixth example embodiments, it is possible to restrict starting an engine or starting a motor in "a state that a reserving person 5 is not present within a vehicle compartment", or "a state that the reserving person 5 or a driver registered in advance is not seated in a driver's seat". However, there is a possibility that, after the engine or the motor is started, an illegal behavior may be performed in which the reserving person 5 gets off the vehicle, or a person other than the reserving person 5 or a driver registered in advance is seated in the driver's seat and drives the vehicle.

A travel control apparatus 20 according to a present example embodiment has a function of restricting such an illegal behavior. Specifically, the travel control apparatus 20 acquires, after an engine or a motor is started, repeatedly acquires an in-vehicle image each time a predetermined authentication condition is satisfied, and determines whether "the reserving person 5 is present within the vehicle compartment", "the reserving person 5 or a driver registered in advance is seated in the driver's seat", and the like. Then, processing according to a determination result is performed.

One example of a functional block diagram of the travel control apparatus 20 is illustrated in FIG. 18 similarly to the fifth and sixth example embodiments.

After an engine or a motor is started, an in-vehicle image acquisition unit 21 continues monitoring whether a predetermined authentication condition is satisfied. When it is determined that the authentication condition is satisfied, the in-vehicle image acquisition unit 21 requests an in-vehicle camera for a new in-vehicle image. The in-vehicle camera inputs the new in-vehicle image to the in-vehicle image acquisition unit 21 in response to the request. The in-vehicle image acquisition unit 21 may continue the monitoring during a time when the engine or the motor is driven.

The predetermined authentication condition is, for example, that a door of a vehicle 6 is opened, a seat belt of the vehicle 6 is unfastened, or a state that the vehicle 6 is not traveling (state that the vehicle 6 continues stopping) is continued for a predetermined time or longer. When one of these phenomena is sensed, there is a possibility that the reserving person 5 has got off the vehicle 6, or the driver has changed.

An in-vehicle sensing unit 22 senses, based on the new in-vehicle image, that the reserving person 5 is present within the vehicle compartment of the vehicle 6, the reserving person 5 is seated in the driver's seat of the vehicle 6, a driver registered in advance is seated in the driver's seat of the vehicle 6, or the like.

When it is not sensed that the reserving person 5 is present within the vehicle compartment of the vehicle, 6, a permission output unit 23 performs error processing. Further, when it is not sensed that the reserving person 5 or a driver registered in advance is seated in the driver's seat of the vehicle 6, the permission output unit 23 performs error processing. The error processing to be performed is following first error processing or second error processing.

"First Error Processing"

The first error processing is notification to a business entity that provides a car sharing service. For example, the travel control apparatus 20 performs notification via a communication network. A content of the notification may include an error content (such that the reserving person 5 is not present within the vehicle compartment of the vehicle 6, a person other than the reserving person 5 and a driver registered in advance is driving the vehicle 6), vehicle identification information of the vehicle 6, information (such as a name) of the reserving person 5, an in-vehicle image, and the like.

Note that, the permission output unit 23 may make a warning to a user before notification to a business entity is performed. The permission output unit 23 may notify an error content via an output apparatus such as a display and a speaker, and request improvement of the error content. Then, after the warning, when traveling of the vehicle 6 is continued for a predetermined time or longer without improvement of the error state, the permission output unit 23 may perform notification to the business entity.

"Second Error Processing"

The second error processing is stopping an engine or a motor. By the stopping, traveling of the vehicle 6 is brought to an untravellable state.

Note that, the permission output unit 23 may make a warning to a user before an engine or a motor is stopped. The permission output unit 23 may notify an error content via an output apparatus such as a display and a speaker, and request improvement of the error content. Then, after the warning, when traveling of the vehicle 6 is continued for a predetermined time or longer without improvement of the error state, the permission output unit 23 may cause the engine or the motor to stop.

Note that, since stopping an engine or a motor during traveling is dangerous, the permission output unit 23 may cause the engine or the motor to stop in a state that the vehicle 6 is not moving. Further, before an engine or a motor is stopped, a warning such as "since an error state is not improved, the engine or the motor is stopped after M minutes later. Stop the vehicle 6 after moving the vehicle 6 to a safe place." may be output.

Figure 22:
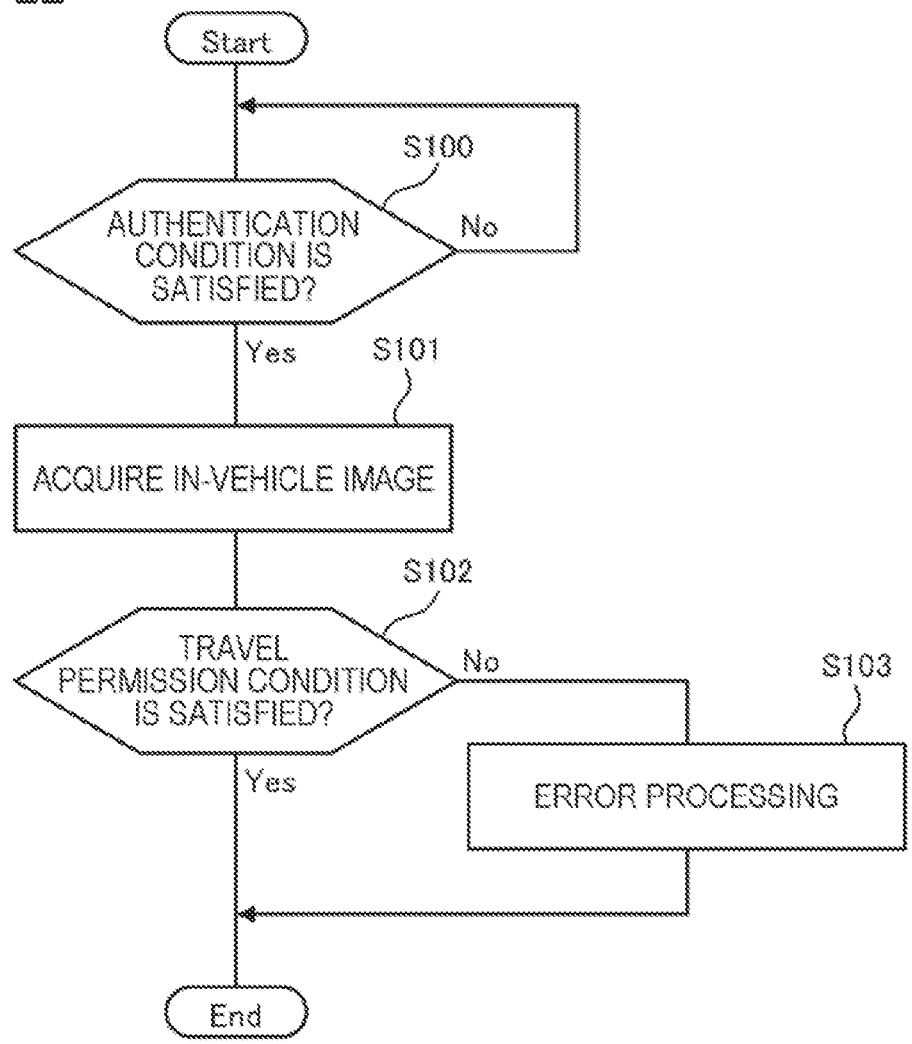
FIG. 22 is a flowchart illustrating one example of a flow of processing of the travel control apparatus according to the present example embodiment.

Next, one example of a flow of processing of the travel control apparatus 20 is described with reference to a flowchart in FIG. 22.

After an engine or a motor is started, the in-vehicle image acquisition unit 21 continues monitoring whether a predetermined authentication condition is satisfied (S100). When it is determined that the authentication condition is satisfied (Yes in S100), the in-vehicle image acquisition unit 21 requests the in-vehicle camera for a new in-vehicle image, and acquires the new in-vehicle image (S101).

Thereafter, the in-vehicle sensing unit 22 determines whether the travel permission condition is satisfied (S102). A flow of processing of determination in S102 is illustrated in the flowchart in FIG. 20 or FIG. 21. Note that, since description on these flowcharts is as described above, description thereof is omitted herein.

When the travel permission condition is not satisfied (No in S102), the permission output unit 23 performs the above-described error processing (S103). On the other hand, when the travel permission condition is satisfied (Yes in S102), the permission output unit 23 does not perform the above-described error processing.

Figure 23:
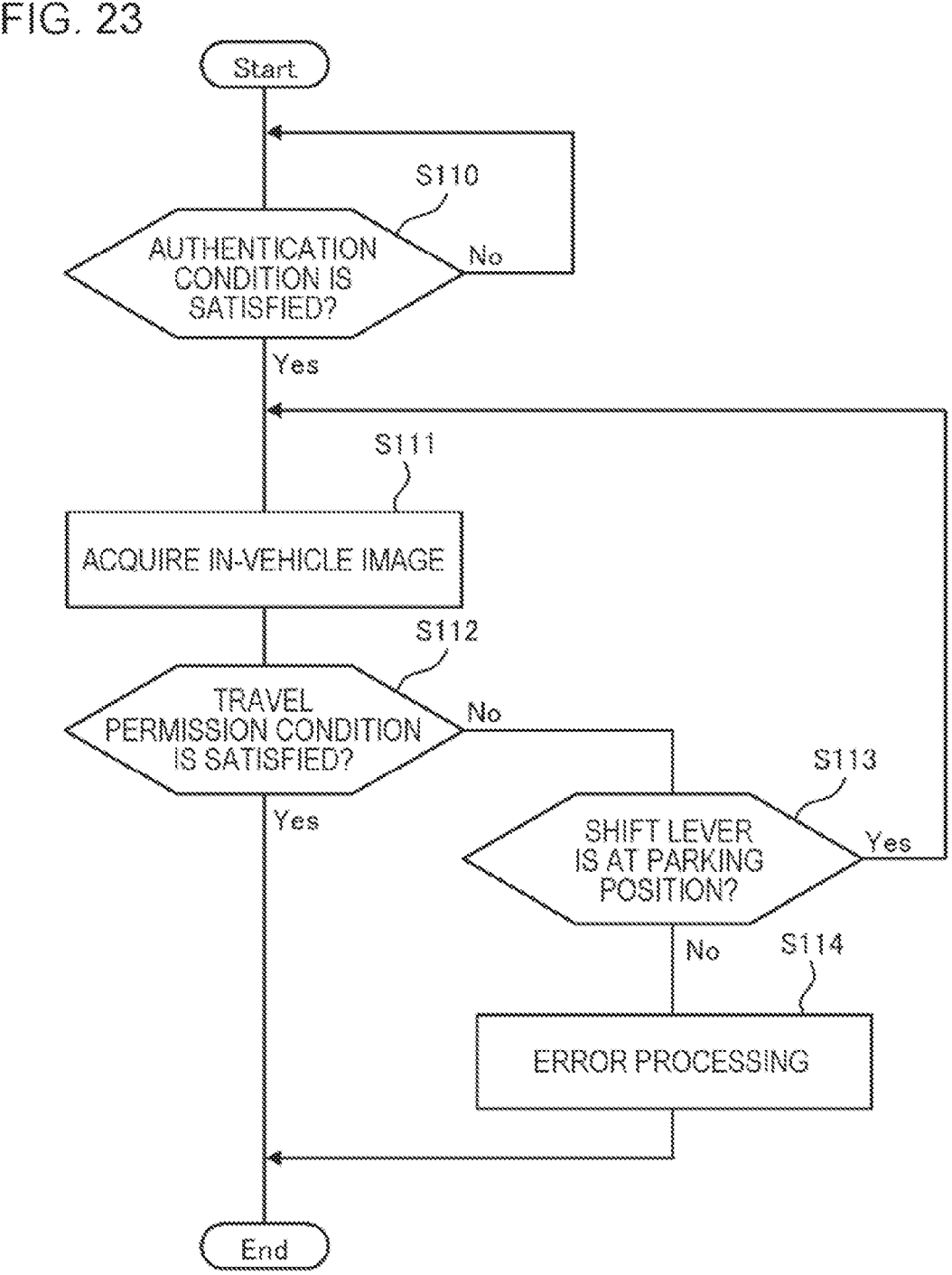
FIG. 23 is a flowchart illustrating one example of a flow of processing of the travel control apparatus according to the present example embodiment.

Next, another example of a flow of processing of the travel control apparatus 20 is described with reference to a flowchart in FIG. 23.

After an engine or a motor is started, the in-vehicle image acquisition unit 21 continues monitoring whether a predetermined authentication condition is satisfied (S110). When it is determined that the authentication condition is satisfied (Yes in S110), the in-vehicle image acquisition unit 21 requests the in-vehicle camera for a new in-vehicle image, and acquires the new in-vehicle image (S111).

Thereafter, the in-vehicle sensing unit 22 determines whether the travel permission condition is satisfied (S112). A flow of processing of determination in S112 is illustrated in the flowchart in FIG. 20 or FIG. 21. Note that, since description on these flowcharts is as described above, description thereof is omitted herein.

When the travel permission condition is not satisfied (No in S112), the permission output unit 23 checks a state of a shift lever of the vehicle 6. When the shift lever is shifted to a position other than a parking position (No in S113), the permission output unit 23 performs the above-described error processing (S114). On the other hand, when the shift lever is shifted to the parking position (Yes in S113), the flow returns to S111, and acquisition (S111) of an in-vehicle image and determination (S112) as to whether the travel permission condition is satisfied are repeated.

Further, when the travel permission condition is satisfied (Yes in S112), the permission output unit 23 does not perform the above-described error processing.

Note that, in the present example embodiment, when a predetermined authentication condition is satisfied, acquisition of an in-vehicle image, determination as to whether a travel permission condition is satisfied, and processing according to a determination result are performed, but as a modification example, these processing may be continued during a time when an engine or a motor is driven.

Other configuration of the car sharing system according to the present example embodiment is similar to those of the fifth and sixth example embodiments.

As described above, in the car sharing system according to the present example embodiment, an advantageous effect similar to the fifth and sixth example embodiments are achieved.

Further, in the car sharing system according to the present example embodiment, after an engine or a motor is started, processing of sensing that "the reserving person 5 is present within the vehicle compartment", "the reserving person 5 or a driver registered in advance is seated in the driver's seat", and the like is performed, and when the presence is not sensed, error processing can be performed. Therefore, it is possible to advantageously restrict an illegal behavior that, after the engine or the motor is started, the reserving person 5 gets off the vehicle 6, or a person other than the reserving person 5 or a driver registered in advance is seated in the driver's seat and drives the vehicle.

Further, in the car sharing system according to the present example embodiment, a warning and the like are performed as the above-described error processing with respect to a traveling vehicle, and it is prevented that a traveling vehicle is immediately brought to an untravellable state. Therefore, it is possible to restrict illegal use, while securing safety.

Further, in the car sharing system according to the present example embodiment, it is possible to perform processing of sensing that "the reserving person 5 is present within the vehicle compartment", "the reserving person 5 or a driver registered in advance is seated in the driver's seat", and the like, in response to sensing of a behavior that has a possibility that the reserving person 5 has got off the vehicle 6, or the driver has changed, such that a door of the reserved vehicle 6 is opened, a seat belt of the reserved vehicle 6 is unfastened, and a state that the vehicle 6 is not traveling is continued for a predetermined time or longer. Consequently, since unnecessary sensing processing is avoided, processing load of a computer is reduced.

Further, in the car sharing system according to the present example embodiment, when a shift lever is not shifted to a parking position, the above-described error processing can be performed. When the shift lever is shifted to the parking position, there is no intention of driving the vehicle 6, and the reserving person 5 may get off the vehicle 6 simply for a rest, or a person other than the reserving person 5 or a driver registered in advance may be seated in the driver's seat with an intention other than driving. In such a case, when error processing is performed, convenience may be deteriorated. In the car sharing system according to the present example embodiment, since error processing can be performed at an appropriate timing, it is possible to avoid deterioration of convenience due to performing of unnecessary error processing.

Eighth Example Embodiment

Figure 24:
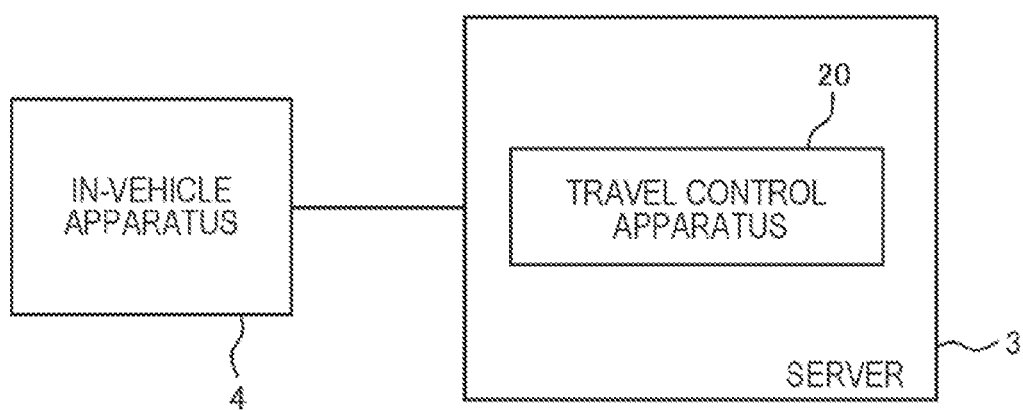
FIG. 24 is one example of a functional block diagram of the car sharing system according to the present example embodiment.

As illustrated in a functional block diagram in FIG. 24, in a car sharing system according to a present example embodiment, a server 3 configured to be communicable with an in-vehicle apparatus 4 includes a travel control apparatus 20. Note that, the server 3 may further include a door lock control apparatus 10. In the car sharing system according to the present example embodiment, an advantageous effect similar to the first to seventh example embodiments is achieved.

Note that, in the present specification, "acquisition" may include "acquisition of data stored in another apparatus or a storage medium by an own apparatus (active acquisition)", based on user input, or based on a command of a program, for example, requesting or inquiring another apparatus and receiving, accessing to another apparatus or a storage medium and reading, and the like. Further, "acquisition" may include "input of data to be output from another apparatus to an own apparatus (passive acquisition)", based on user input, or based on a command of a program, for example, receiving data to be distributed (or transmitted, push-notified, or the like), and the like. Further, "acquisition" may include acquisition by selecting from among received data or information, and "generating new data by editing data (such as converting into a text, rearranging data, extracting a part of pieces of data, and changing a file format) and the like, and acquiring the new data".

A part or all of the above-described example embodiments may also be described as the following supplementary notes, but is not limited to the following.

1. A travel control apparatus including:
   an in-vehicle image acquisition means for acquiring an in-vehicle image generated by a camera for capturing an inside of a vehicle compartment of a reserved vehicle;
   an in-vehicle sensing means for sensing that a reserving person is present within a vehicle compartment of the reserved vehicle, based on the in-vehicle image; and
   a permission output means for outputting, when it is sensed that the reserving person is present within a vehicle compartment of the reserved vehicle, travel permission of the reserved vehicle.

2. The travel control apparatus according to supplementary note 1, wherein
   the in-vehicle sensing means senses that the reserving person is present within a vehicle compartment of the reserved vehicle, based on a face image of the reserving person registered in advance, and the in-vehicle image.

3. The travel control apparatus according to supplementary note 1 or 2, wherein
the in-vehicle sensing means senses that the reserving person is seated in a driver's seat, and
the permission output means outputs, when it is sensed that the reserving person is seated in a driver's seat, travel permission of the reserved vehicle.

4. The travel control apparatus according to supplementary note 1 or 2, wherein
the in-vehicle sensing means senses that a driver registered in advance is seated in a driver's seat, and
the permission output means outputs, when it is sensed that the reserving person is present within a vehicle compartment of the reserved vehicle, and it is sensed that a driver registered in advance is seated in a driver's seat, travel permission of the reserved vehicle.

5. The travel control apparatus according to any one of supplementary notes 1 to 4, wherein
the in-vehicle image acquisition means acquires the in-vehicle image being new, when a predetermined authentication condition is satisfied,
the in-vehicle image sensing means senses that the reserving person is present within a vehicle compartment of the reserved vehicle, based on the in-vehicle image being new, and
the permission output means performs error processing, when it is not sensed that the reserving person is present within a vehicle compartment of the reserved vehicle.

6. The travel control apparatus according to supplementary note 5, wherein
the authentication condition is that a door of the reserved vehicle is opened, a seat belt of the reserved vehicle is unfastened, or a state that the vehicle is not traveling is continued for a predetermined time or longer.

7. The travel control apparatus according to supplementary note 5 or 6, wherein
the in-vehicle sensing means senses that the reserving person or a driver registered in advance is seated in a driver's seat, based on the in-vehicle image being new, and
the permission output means performs the error processing, when it is not sensed that the reserving person or a driver registered in advance is seated in a driver's seat.

8. The travel control apparatus according to any one of supplementary notes 5 to 7, wherein
the permission output means performs the error processing, when a shift lever of the reserved vehicle is shifted to a position other than a parking position.

9. The travel control apparatus according to any one of supplementary notes 1 to 8, being a server, or an in-vehicle apparatus mounted in the reserved vehicle.

10. A travel control method including:
by a computer,
acquiring an in-vehicle image generated by a camera for capturing an inside of a vehicle compartment of a reserved vehicle;
sensing that a reserving person is present within a vehicle compartment of the reserved vehicle, based on the in-vehicle image; and
outputting, when it is sensed that the reserving person is present within a vehicle compartment of the reserved vehicle, travel permission of the reserved vehicle.

11. A program causing a computer to function as:
an in-vehicle image acquisition means for acquiring an in-vehicle image generated by a camera for capturing an inside of a vehicle compartment of a reserved vehicle;
an in-vehicle sensing means for sensing that a reserving person is present within a vehicle compartment of the reserved vehicle, based on the in-vehicle image; and
a permission output means for outputting, when it is sensed that the reserving person is present within a vehicle compartment of the reserved vehicle, travel permission of the reserved vehicle.

While the present invention has been described with reference to the example embodiments (and examples), the present invention is not limited to the above-described example embodiments (and examples). A configuration and details of the present invention may be modified in various ways comprehensible to a person skilled in the art within the scope of the present invention.

This application is based upon and claims the benefit of priority from Japanese patent application No. 2019-175074, filed on Sep. 26, 2019, the disclosure of which is incorporated herein in its entirety by reference.

REFERENCE SIGNS LIST

1A Processor
2A Memory
3A Input/output I/F
4A Peripheral circuit
5A Bus
1 Site
2 Camera
3 Server
4 In-vehicle apparatus
5 Reserving person
6 Vehicle
10 Door lock control apparatus
11 On-site image acquisition unit
12 On-site sensing unit
13 Release command output unit
14 Storage unit
15 Command acquisition unit
16 Lock control unit
17 Storage unit
20 Travel control apparatus
21 In-vehicle image acquisition unit
22 In-vehicle sensing unit
23 Permission output unit
24 Storage unit

What is claimed is:
1. A control apparatus comprising:
at least one memory configured to store one or more instructions; and
at least one processor configured to execute the one or more instructions to:
acquire a first image from a camera in a vehicle;
perform a first determination to determine if a user of the vehicle is present within the vehicle, based on the first image;
output, based on the first determination indicating that the user is present within the vehicle, permission to run the vehicle;
perform a second determination to determine if a user change condition is satisfied;
acquire, based on the user change condition being satisfied, a second image from the camera;

perform a third determination to determine if the user of the vehicle is present within the vehicle, based on the second image; and
perform error processing, based on the third determination indicating that the user is not present within the vehicle.

2. The control apparatus according to claim 1, wherein the processor is further configured to execute the one or more instructions to perform the first determination to determine if the user is present within the vehicle, based on a face image of the user registered in advance, and the first image.

3. The control apparatus according to claim 1, wherein the processor is further configured to execute the one or more instructions to:
perform the first determination to determine if the user is seated in a driver's seat of the vehicle, and
output, based on the first determination indicating that the user is seated in the driver's seat of the vehicle, the permission to run the vehicle.

4. The control apparatus according to claim 1, wherein the processor is further configured to execute the one or more instructions to:
perform a fourth determination to determine if a driver registered in advance is seated in a driver's seat, and
output, based on the first determination indicating that the user is present within the vehicle and based on the fourth determination indicating that the driver registered in advance is seated in the driver's seat, the permission to run the vehicle.

5. The control apparatus according to claim 1, wherein the user change condition is satisfied in a case that the vehicle continues stopping for a predetermined time or longer.

6. The control apparatus according to claim 1, wherein the processor is further configured to execute the one or more instructions to:
perform a fifth determination to determine if the user of the vehicle or a driver registered in advance is seated in a driver's seat, based on the second image, and
perform the error processing, based on the fifth determination indicating that the user of the vehicle or a driver registered in advance is seated in the driver's seat.

7. The control apparatus according to claim 1, wherein the processor is further configured to execute the one or more instructions to perform the error processing, in a case that a shift lever of the vehicle is shifted to a position other than a parking position.

8. The control apparatus according to claim 1, wherein the control apparatus is a server, or an in-vehicle apparatus mounted in the vehicle.

9. The control apparatus according to claim 1, wherein the error processing comprises providing a notification to a person within the vehicle or a notification to a business entity providing the vehicle.

10. The control apparatus according to claim 1, wherein the vehicle is reserved for use by the user, and
the processor is further configured to execute the one or more instructions to perform the first determination to determine if the user of the vehicle is present within the vehicle, based on the first image and reservation information of the vehicle.

11. The control apparatus according to claim 10, wherein the vehicle is for use in a car sharing service.

12. The control apparatus according to claim 1, wherein the user change condition is satisfied in a case that a door of the vehicle is opened, or that a seat belt of the vehicle is unfastened.

13. A control method comprising:
by a computer,
acquiring a first image from a camera in a vehicle;
performing a first determination to determine if a user of the vehicle is present within the vehicle, based on the first image;
outputting, based on the first determination indicating that the user is present within the vehicle, permission to run the vehicle;
performing a second determination to determine if a user change condition is satisfied;
acquiring, based on the user change condition being satisfied, a second image from the camera;
performing a third determination to determine if the user of the vehicle is present within the vehicle, based on the second image; and
performing error processing, based on the third determination indicating that the user is not present within the vehicle.

14. The method according to claim 13, wherein
the user change condition is satisfied in a case that the vehicle continues stopping for a predetermined time or longer.

15. The method according to claim 13, wherein
performing the error processing comprises providing a notification to a person within the vehicle or a notification to a business entity providing the vehicle.

16. The method according to claim 13, wherein
the vehicle is reserved for use by the user, and
the method further comprises performing the first determination to determine if the user of the vehicle is present within the vehicle, based on the first image and reservation information of the vehicle.

17. A non-transitory storage medium storing a program causing a computer to:
acquire a first image from a camera in a vehicle;
perform a first determination to determine if a user of the vehicle is present within the vehicle, based on the first image;
output, based on the first determination indicating that the user is present within the vehicle, permission to run the vehicle;
perform a second determination to determine if a user change condition is satisfied;
acquire, based on the user change condition being satisfied, a second image from the camera;
perform a third determination to determine if the user of the vehicle is present within the vehicle, based on the second image; and
perform error processing, based on the third determination indicating that the user is not present within the vehicle.

18. The non-transitory storage medium according to claim 17, wherein
the user change condition is satisfied in a case that the vehicle continues stopping for a predetermined time or longer.

19. The non-transitory storage medium according to claim 17, wherein
the error processing comprises providing a notification to a person within the vehicle or a notification to a business entity providing the vehicle.

20. The non-transitory storage medium according to claim 17, wherein
the vehicle is reserved for use by the user, and
the non-transitory storage medium storing a program further causes the computer to perform the first determination to determine if the user of the vehicle is present within the vehicle, based on the first image and reservation information of the vehicle.

* * * * *